(12) United States Patent
Yamazaki et al.

(10) Patent No.: US 8,232,621 B2
(45) Date of Patent: Jul. 31, 2012

(54) SEMICONDUCTOR DEVICE

(75) Inventors: Shunpei Yamazaki, Setagaya (JP); Yasuyuki Arai, Atsugi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 150 days.

(21) Appl. No.: 11/878,349

(22) Filed: Jul. 24, 2007

(65) Prior Publication Data
US 2008/0023793 A1   Jan. 31, 2008

(30) Foreign Application Priority Data

Jul. 28, 2006 (JP) ................................. 2006-206912

(51) Int. Cl.
*H01L 27/08* (2006.01)

(52) U.S. Cl. ........ 257/531; 257/277; 257/421; 257/428; 257/E21.002; 257/E27.122; 438/618; 438/622

(58) Field of Classification Search .............. 257/40, 257/E51.005, 347, 492, E21.022, E27.122, 257/428, 531, 421, 277; 438/622, 618
See application file for complete search history.

(56) References Cited

U.S. PATENT DOCUMENTS

| 4,599,486 | A | * | 7/1986 | Herrandez | ................ | 174/72 B |
|---|---|---|---|---|---|---|
| 4,788,102 | A | | 11/1988 | Koning et al. | | |
| 5,219,377 | A | | 6/1993 | Poradish | | |
| 5,598,032 | A | | 1/1997 | Fidalgo | | |
| 5,643,804 | A | | 7/1997 | Arai et al. | | |
| 5,796,165 | A | | 8/1998 | Yoshikawa et al. | | |
| 5,800,763 | A | | 9/1998 | Hoppe et al. | | |
| 5,877,533 | A | | 3/1999 | Arai et al. | | |
| 6,020,627 | A | | 2/2000 | Fries et al. | | |
| 6,301,119 | B1 | | 10/2001 | Thevenot et al. | | |
| 6,410,960 | B1 | | 6/2002 | Arai et al. | | |
| 6,424,315 | B1 | | 7/2002 | Glenn et al. | | |
| 6,478,228 | B1 | | 11/2002 | Ikefuji et al. | | |

(Continued)

FOREIGN PATENT DOCUMENTS

CN   101142715   3/2008

(Continued)

OTHER PUBLICATIONS

Chinese Office Action (Application No. 200710136777.0) Dated Dec. 21, 2010.

*Primary Examiner* — Kimberly Nguyen
*Assistant Examiner* — Maria Ligai
(74) *Attorney, Agent, or Firm* — Eric J. Robinson; Robinson Intellectual Property Law Office, P.C.

(57) ABSTRACT

When letters are written with a ballpoint pen, pen pressure is greater than or equal to 10 MPa. The IC tag embedded in the paper base material is required to withstand such pen pressure. An integrated circuit including a functional circuit which transmits and receive, performs arithmetic of, and stores information is thinned, and also, when the integrated circuit and a structural body provided with an antenna or a wiring are attached, a second structural body formed of ceramics or the like is also attached to at the same time. When the second structural body formed of ceramics or the like is used, resistance to pressing pressure or bending stress applied externally can be realized. Further, a part of passive elements included in the integrated circuit can be transferred to the second structural body, which leads to reduction in area of the semiconductor device.

10 Claims, 17 Drawing Sheets

U.S. PATENT DOCUMENTS

| | | | |
|---|---|---|---|
| 6,682,963 B2 | 1/2004 | Ishikawa | |
| 6,698,084 B2 | 3/2004 | Uchikoba | |
| 6,713,162 B2 | 3/2004 | Takaya et al. | |
| 7,056,810 B2 | 6/2006 | Yamazaki et al. | |
| 7,067,926 B2 | 6/2006 | Yamazaki et al. | |
| 7,109,071 B2 | 9/2006 | Ishikawa | |
| 7,164,151 B2 | 1/2007 | Yamazaki et al. | |
| 7,230,316 B2 | 6/2007 | Yamazaki et al. | |
| 7,297,423 B2 | 11/2007 | Mizuno et al. | |
| 7,303,942 B2 | 12/2007 | Kuwabara et al. | |
| 7,332,381 B2 | 2/2008 | Maruyama et al. | |
| 7,335,951 B2 | 2/2008 | Nishi et al. | |
| RE40,137 E | 3/2008 | Tuttle et al. | |
| 7,408,193 B2 | 8/2008 | Ishikawa | |
| 7,432,784 B2 | 10/2008 | Togashi | |
| 7,440,256 B2 | 10/2008 | Hongo et al. | |
| 7,511,380 B2 | 3/2009 | Yamazaki et al. | |
| 7,642,612 B2 | 1/2010 | Izumi et al. | |
| 7,655,081 B2 | 2/2010 | Dai et al. | |
| 7,695,981 B2 | 4/2010 | Dai et al. | |
| 7,714,535 B2 | 5/2010 | Yamazaki et al. | |
| 7,838,976 B2 | 11/2010 | Yamazaki et al. | |
| 7,852,044 B2 | 12/2010 | Yamazaki et al. | |
| 7,902,639 B2 | 3/2011 | Garrou et al. | |
| 2003/0060172 A1 | 3/2003 | Kuriyama et al. | |
| 2003/0082889 A1 | 5/2003 | Maruyama et al. | |
| 2003/0219935 A1* | 11/2003 | Miyairi et al. | 438/166 |
| 2004/0099926 A1 | 5/2004 | Yamazaki et al. | |
| 2004/0107555 A1 | 6/2004 | Hattori et al. | |
| 2004/0119504 A1* | 6/2004 | Baude et al. | 326/104 |
| 2004/0124542 A1 | 7/2004 | Kuwabara et al. | |
| 2005/0116310 A1 | 6/2005 | Nishi et al. | |
| 2005/0168339 A1* | 8/2005 | Arai et al. | 340/572.8 |
| 2005/0239236 A1* | 10/2005 | Oya | 438/123 |
| 2006/0043346 A1 | 3/2006 | Kodas et al. | |
| 2006/0214306 A1 | 9/2006 | Yamazaki et al. | |
| 2006/0220211 A1 | 10/2006 | Yamazaki et al. | |
| 2007/0018164 A1 | 1/2007 | Ishikawa | |
| 2007/0176622 A1* | 8/2007 | Yamazaki | 324/770 |
| 2007/0176845 A1* | 8/2007 | Yamazaki et al. | 343/895 |
| 2007/0257797 A1 | 11/2007 | Rancien et al. | |
| 2008/0044660 A1 | 2/2008 | Takaya et al. | |
| 2008/0169349 A1* | 7/2008 | Suzuki et al. | 235/492 |
| 2011/0057628 A1 | 3/2011 | Yamazaki et al. | |
| 2011/0068438 A1 | 3/2011 | Yamazaki et al. | |

FOREIGN PATENT DOCUMENTS

| | | |
|---|---|---|
| DE | 195 00 925 | 7/1996 |
| JP | 02-005448 | 1/1990 |
| JP | 2002-049901 | 2/2002 |
| JP | 2004-102353 | 4/2004 |
| JP | 2005-350823 | 12/2005 |
| JP | 2006-018364 A | 1/2006 |
| JP | 2006-149163 | 6/2006 |
| WO | WO 01/52184 | 7/2001 |
| WO | WO-2006/098390 | 9/2006 |

* cited by examiner

SEMICONDUCTOR DEVICE

BACKGROUND OF THE INVENTION

1. Field of the Invention

The present invention relates to an information recording carrier which is used for information technology referred to as RFID (Radio Frequency Identification). Specifically, the present invention relates to a semiconductor device capable of transmitting and receiving information via electromagnetic waves, which is also referred to as an IC tag.

2. Description of the Related Art

Information technology which is referred to as RFID (Radio Frequency Identification) has been spread. For example, an IC tag which is a tag with its outside dimension of several centimeters and which stores data communicates with a reader wirelessly is known. An IC tag includes an antenna and an IC chip having a communication circuit and a memory.

As one mode of an IC tag, a mode in which an antenna and an IC chip are embedded in paper is known. For example, a mode in which, in order to embed an IC tag having a thickness of less than or equal to 200 µm in an object such as paper, a metal layer for forming a wiring pattern or an antenna is formed to be thinner in a region in which an IC chip is mounted than other regions is known (see Patent Document 1: Japanese Published Patent Application No. 2002-049901 (page 3, FIG. 1)). In addition, a structure in which the IC tag is formed to have a thickness of 60 µm to 70 µm in order to embed the IC tag in a paper base material (see Patent Document 2: Japanese Published Patent Application No. 2005-350823 (page 5, FIG. 1)).

SUMMARY OF THE INVENTION

There are various kinds of paper available in the market. A4-sized copy paper having a thickness of 80 µm to 90 µm can be given as an example. In order to embed an IC tag in such ordinary paper without users feeling uncomfortable, it is needed that the thickness of the IC tag is half or less than that of a paper base material. However, there arises a problem such that an IC tag is easily broken by pressing pressure or bending stress applied by a pointed object, as the IC tag becomes thin.

In a case in which an IC tag is mounted on a surface of or in a paper base material, it is necessary to pay attention not to break the IC tag in a manufacturing process. Further, the paper base material needs to have a surface which can be printed or written with a writing instrument. For example, when letters are written with a ballpoint pen, pen pressure is greater than or equal to 10 MPa. The IC tag mounted on the paper base material is required to withstand such pen pressure.

In view of the foregoing, it is an object of the present invention to maintain required function and robustness of an IC tag or a semiconductor device having the equivalent function, even when they are thinned.

One feature of the present invention is that an integrated circuit including functional circuits which transmit and receive, perform arithmetic of, and store information is thinned. In addition, when the integrated circuit and a structural body provided with an antenna or a wiring are attached, a second structural body formed of ceramics or the like is also attached at the same time.

The integrated circuit which is thinned includes a structure in which a semiconductor layer having a thickness of 5 nm to 200 nm is interposed between insulating layers provided over and under the semiconductor layer. The integrated circuit is formed using a semiconductor substrate having a thickness of 1 µm to 100 µm, preferably, 10 µm to 50 µm. When the second structural body formed of ceramics or the like is used with a semiconductor device including the thin integrated circuit and the antenna, the semiconductor device can have resistance to pressing pressure or bending stress applied externally.

A wiring which connects the antenna and the integrated circuit may be formed in the second structural body. In addition, a passive component such as a resistor, a capacitor, a coil, and the like may be formed in the second structural body. For example, a capacitor in which a plurality of dielectric layers each having a thickness of 0.1 µm to 1 µm are stacked may be included in the second structural body.

When a part of circuit elements needed for operation of the semiconductor device is formed in the second structural body in this manner, a part of the functions in the integrated circuit can be transferred to the second structural body.

According to the present invention, when the structural body formed of ceramics or the like is used, stiffness of the semiconductor device can be improved. Accordingly, even when an IC tag or the semiconductor device having the equivalent function is thinned, their required functions and robustness can be maintained. For example, even when pressing pressure is applied by a pointed object such as a pen tip, malfunction of an integrated circuit due to stress can be prevented. Moreover, resistance to bending stress can also be provided. In addition, when a wiring for connection is formed in the structural body formed of ceramics or the like in order to connect an antenna and the integrated circuit, malfunction caused by detachment of a connection portion can be prevented even when bending stress is applied.

DETAILED DESCRIPTION OF THE INVENTION

Embodiment Mode

Figure 1:
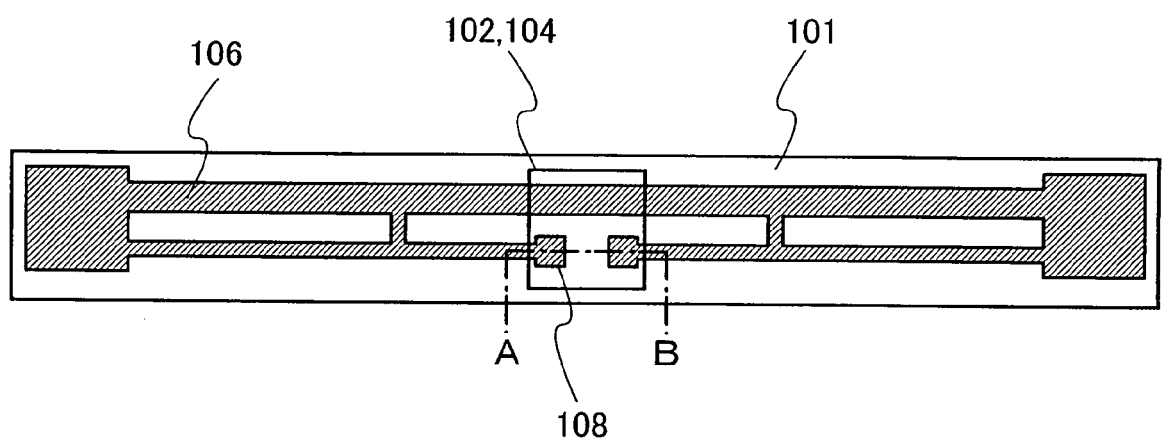
FIG. 1 is a plan view showing one mode of a semiconductor device of the present invention.

Hereinafter, an embodiment mode and embodiments of the present invention are described with reference to the accompanying drawings. Note that the present invention is not limited to the following description and it is easily understood by those skilled in the art that modes and details can be modified in various ways without departing from the purpose and the scope of the present invention. Accordingly, the present invention should not be interpreted as being limited to the description of the embodiment mode and embodiments to be given below. Note that like portions in the drawings may be denoted by the like reference numerals in a structure of the present invention to be given below.

One mode of a semiconductor device of the present invention includes a first structural body provided with an antenna, an integrated circuit having a semiconductor layer interposed between insulating layers provided over and under the semiconductor layer and an active element is formed with the semiconductor layer, and a second structural body with more stiffness than the first structural body. The second structural body is used for connecting the first structural body provided with the antenna and the integrated circuit. In this case, the second structural body is preferably provided with an electrode for connecting the antenna and the integrated circuit.

FIG. 1 shows one example of such a semiconductor device. A first structural body 101 is formed of an insulating material. A plastic sheet, a plastic film, a glass epoxy resin, a glass plate, paper, a nonwoven fabric, or other variety of objects can be used as the insulating material. The first structural body has a thickness of 1 μm to 100 μm, preferably, 5 μm to 30 μm.

An antenna 106 is formed of a conductive material on at least one of the surfaces of the first structural body 101. A structure of the antenna is preferably made different in accordance with a communication frequency band used by the semiconductor device. The antenna may have a suitable shape for a frequency band, when frequency in a short wave band (electromagnetic waves with frequency of 1 to 30 MHz), an ultrashort wave band (electromagnetic waves with frequency of 30 to 300 MHz), or a microwave band (electromagnetic waves of 0.3 to 3 GHz) is used. FIG. 1 shows a dipole antenna, which is suited for communication in the ultrashort wave band and the microwave band. A monopole antenna, a patch antenna, a spiral antenna, a loop antenna, or the like can be used as the antenna, instead of the dipole antenna shown in FIG. 1.

The antenna 106 is provided with an antenna terminal 108 to connect the antenna 106 to an integrated circuit 104. The integrated circuit 104 is provided so as to overlap with the first structural body 101 at least partially. A second structural body 102 is used as a connector for tightening the connection between the first structural body 101 and the integrated circuit 104. An example of this connection structure is described with reference to a cross-sectional structure taken along a line A-B in FIG. 1.

Figure 2:
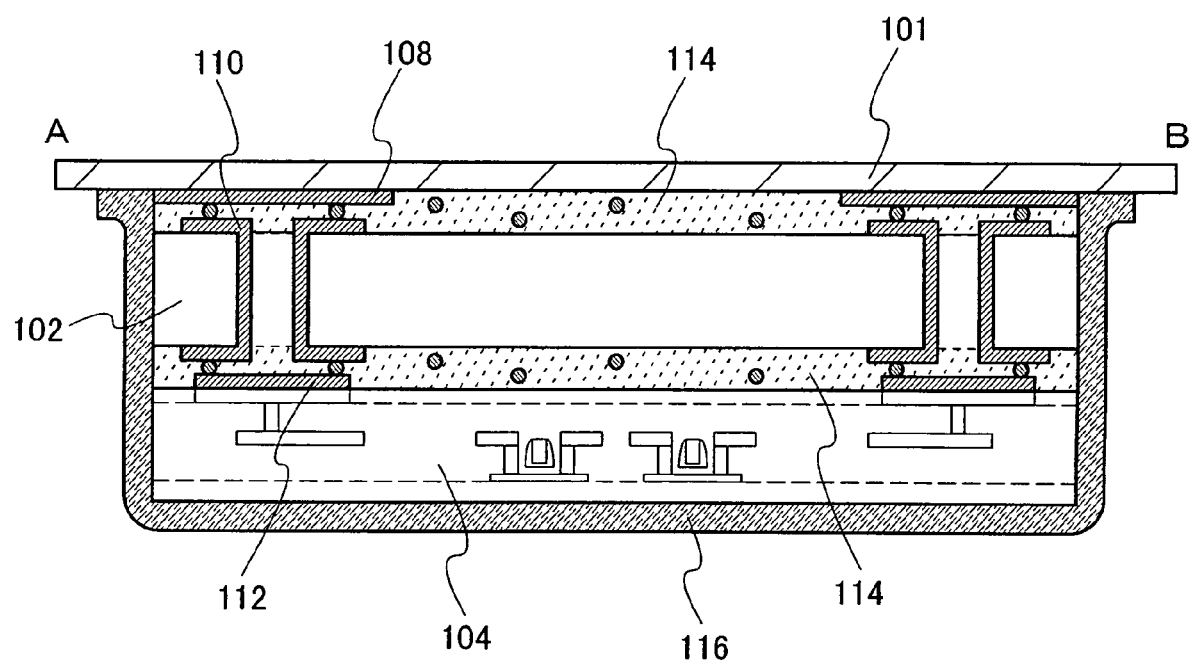
FIG. 2 is a cross-sectional view showing one example of a structure taken along a line A-B in FIG. 1.

FIG. 2 shows a cross-sectional structure of a semiconductor device taken along the line A-B in FIG. 1. The second structural body 102 and the first structural body 101 are located so that a side of the first structural body 101 on which the antenna terminal 108 is formed and one side of the second structural body 102 face each other. The integrated circuit 104 is located to face the other side of the second structural body 102. A through electrode 110 is formed in the second structural body 102 in a position corresponding to the antenna terminal 108. The through electrode 110 is formed in a manner such that the through electrode 110 can be connected to a connection electrode 112 of the integrated circuit 104 on the other side of the connection electrode 112. The through electrode 110 is formed using a metal foil or metal paste in a through hole formed in the second structural body 102.

The second structural body 102 is preferably formed to have a thickness of 1 μm to 50 μm, more preferably, 5 μm to 30 μm and is harder than the first structural body 101. In addition, the second structural body 102 preferably has toughness and elasticity to certain bending stress. This is because in a case where the first structural body 101 is formed of a flexible material such as a plastic film or a nonwoven fabric, bending stress can be dispersed when the second structural body 102 has certain elasticity. Accordingly, disconnection failure between the antenna terminal 108 and the antenna terminal 112 which are connected via the through electrode 110 can be prevented. In addition, when the through electrode 110 is formed in the second structural body 102, the integrated circuit 104 can be downsized.

The second structural body 102 can be formed of an insulating substance such as hard plastics or glass. Specifically, a ceramic material is preferably used. This is because the ceramic material realizes the foregoing characteristics and therefore, the material to be used can be selected from a wide range of materials. Further, a plurality of ceramics can be combined to be composed.

As a typical example of the ceramic material, alumina ($Al_2O_3$) is preferably used as a highly insulating material. In addition, barium titanate ($BaTiO_3$) is preferably used as a high capacitance material. When mechanical strength has higher priority, alumina ($Al_2O_3$), titanium oxide ($TiO_x$), silicon carbide (SiC), tempered glass, or crystallized glass is preferably used. In addition, when composite ceramics in which nanoparticles of SiC are added to $Si_3N_4$, or composite ceramics containing hexagonal system BN is used, high strength, oxidation resistance, and high toughness can be obtained, which is preferable.

These ceramic materials may be used to form a stacked layer structure in which a plurality of layers each having a thickness of 0.1 μm to 2 μm are stacked. In other words, it is possible that a stacked-layer substrate is formed and an electrode is formed in each layer, so that a stacked layer capacitor is formed therein. Further, a passive element such as a coil and a resistor may be included in the second structural body by utilizing a ceramic material.

In the integrated circuit 104, a circuit is formed using an active element formed with a semiconductor layer having a thickness of 5 nm to 500 nm, preferably, 30 nm to 150 nm. Insulating layers are provided over and under the semiconductor layer. These insulating layers are formed as layers protecting the semiconductor layer. In addition, the insulating layers may be used as a functional layer such as a gate insulating layer. A typical example of an active element is a field-effect transistor. Since the semiconductor layer is a thin film as described above, a field-effect transistor formed here is also referred to as a thin film transistor. The semiconductor layer preferably is a crystalline semiconductor layer which is crystallized, after the semiconductor layer is formed by a vapor deposition method, a sputtering method, or the like, by heat treatment and/or energy beam irradiation of laser beam or the like. This is because when a crystalline semiconductor layer is used, field-effect mobility of the field-effect transistor becomes 30 to 500 $cm^2V \cdot sec$ (electron), which allows a logic circuit to operate. Needless to say, the integrated circuit may include a circuit element such as a resistor, a capacitor, or a coil, in addition to the active element.

In the integrated circuit 104, by forming a wiring either or both over and under the semiconductor layer, various functional circuits such as a high frequency circuit, an oscillator circuit, or an arithmetic processing circuit can be formed. The integrated circuit 104 is preferably formed to have a thickness of 0.5 μm to 5 μm in total, including the semiconductor layer, the insulating layer, a layer forming the wiring. When the integrated circuit 104 is formed to have this thickness, the integrated circuit 104 can contribute to reduction in thickness of the semiconductor device. Further, the integrated circuit 104 can have resistance to bending stress. When the semiconductor layer is separated to be island-shaped semiconductor layers, resistance to bending stress can be improved. In addition, an integrated circuit may be formed over a predetermined substrate, and then the integrated circuit and the substrate may be separated, whereby the integrated circuit can be thinned. In this manner, a semiconductor device having a thickness of 2 μm to 150 μm, preferably, 10 μm to 60 μm can be obtained.

Figure 16:
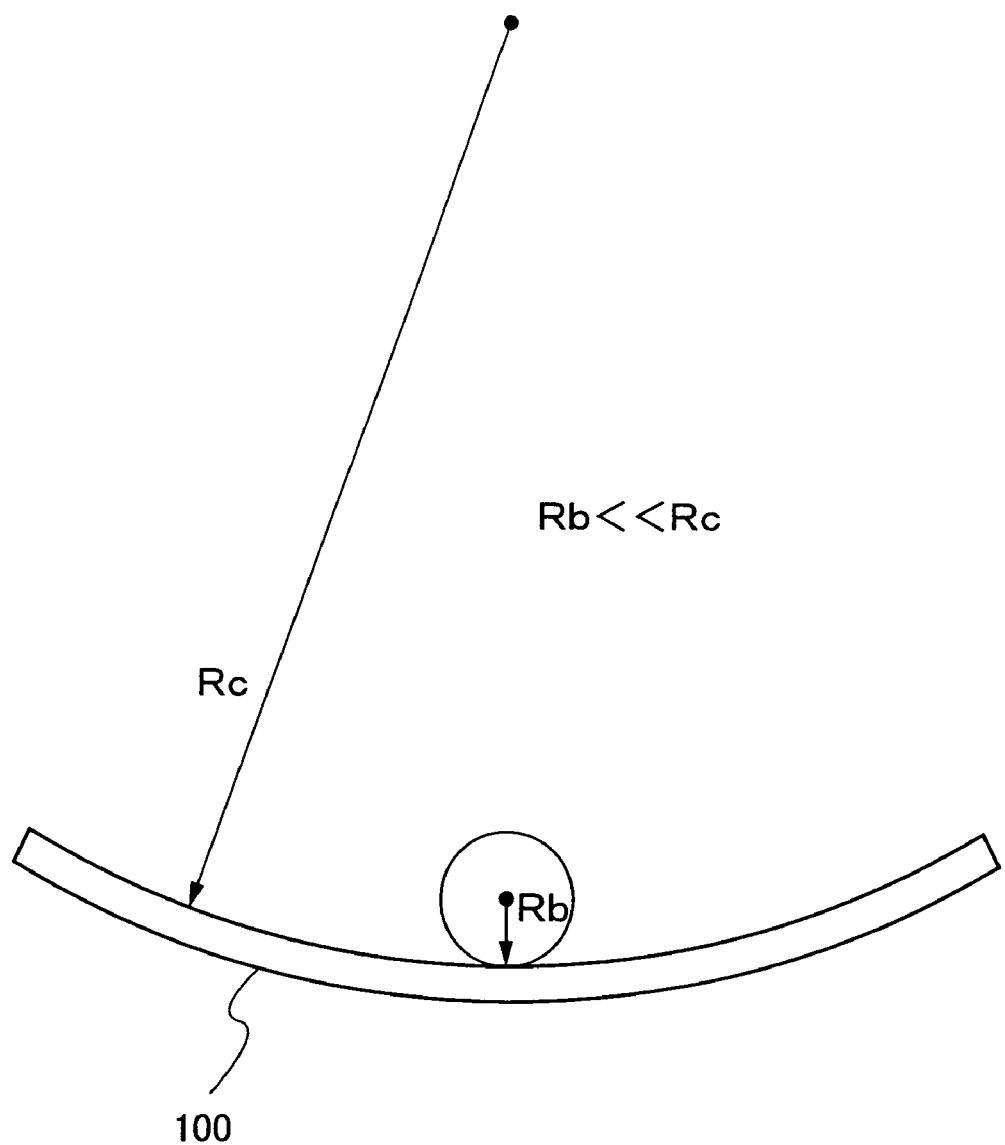
FIG. 16 is a diagram illustrating a curvature radius which can be curved by a semiconductor device.

In addition, when the above described structure is formed, the semiconductor device 100 can be curved while being provided with restoring force within a certain range as shown in FIG. 16. For example, even when a pointed object such as a pen tip of a ballpoint pen with a curvature Rb strikes the semiconductor device, the semiconductor device can be curved up to a curvature Rc. The relationship between Rb and Rc is as follows: Rb<<Rc, for example, $3Rb \leq Rc$.

The first structural body 101 and the second structural body 102 are fixed by an adhesive 114 so that the antenna terminal 108 and the through electrode 110 are electrically connected. For example, an acrylic-based, urethane-based, or epoxy-based adhesive, in which conductive particles are dispersed, can be used as the adhesive 114. Alternatively, the antenna terminal 108 and the through electrode 110 may be connected by a conductive paste or a solder paste and another part may be fixed by an acrylic-based, urethane-based, or epoxy-based adhesive. Also, the second structural body 102 and the integrated circuit 104 are fixed similarly so that the through electrode 110 and the connection electrode 112 are electrically connected.

A sealing material 116 is formed of an acrylic-based, urethane-based, phenol-based, epoxy-based, or silicone-based resin material and is preferably provided in order to protect the integrated circuit 104. The sealing material 116 is formed to cover the integrated circuit 104 and to preferably cover side surfaces of the integrated circuit 104 and the second structural body 102. When the sealing material 116 is provided, the integrated circuit 104 can be prevented from being damaged. Further, adhesion between the integrated circuit 104, the second structural body 102, and the first structural body 101 can be enhanced.

Figure 3:
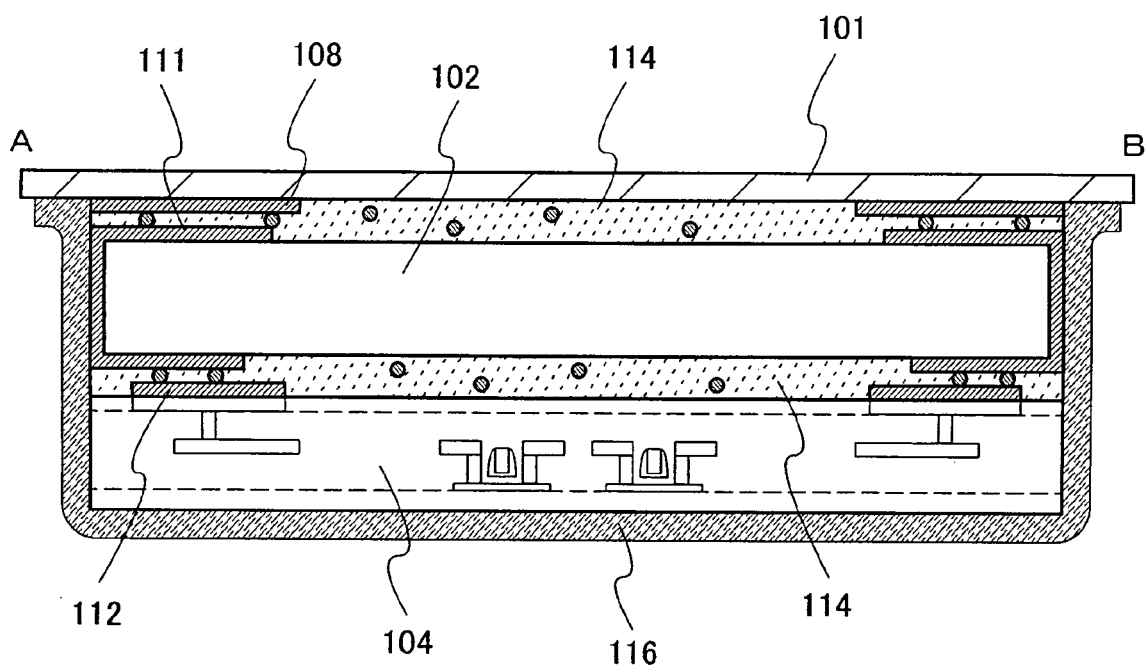
FIG. 3 is a cross-sectional view showing one example of a structure taken along a line A-B in FIG. 1.

FIG. 3 shows a mode of the second structure body different from that in FIG. 2. FIG. 3 shows a structure in which a side covering electrode 111 for connecting the antenna terminal 108 and the connection electrode 112 electrically is formed via a side end of the second structural body 102. With this structure, a specific processing on the second structural body 102 is not necessary and the side covering electrode 111 can be simply provided. The side covering electrode 111 may be formed by a printing method or a plating method, or by attaching a metal foil. When the side covering electrode 111 is formed in this manner, the second structural body 102 can be thinned. The second structural body 102 can be formed of hard plastics, glass, ceramics, or a composite ceramic material, and an element such as a capacitor, a coil, and a resistor can be formed therein. In FIG. 3, too, the first structural body 101, the second structural body 102, and the integrated circuit 104 are fixed by the adhesive 114. Further, the sealing material 116 is preferably formed.

Figure 4A:
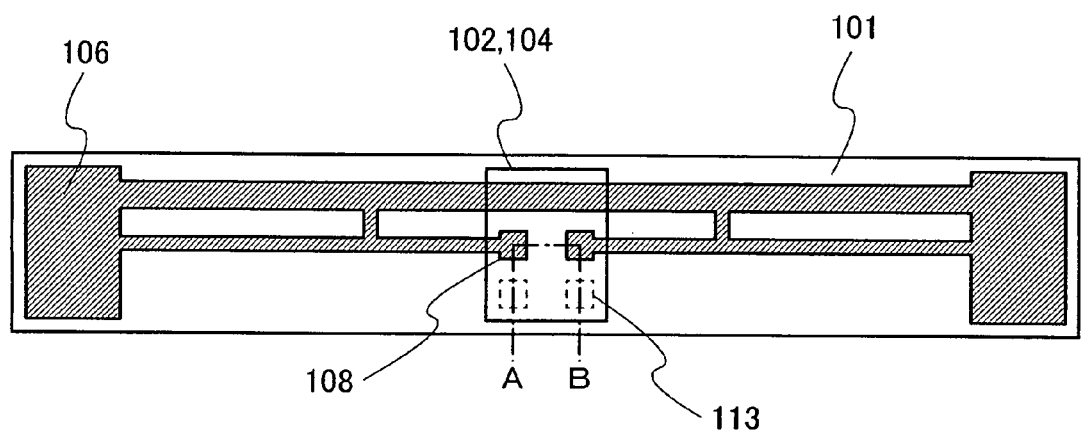
FIGS. 4A and 4B are a plan view and a cross-sectional view, respectively, showing one mode of a semiconductor device of the present invention.
Figure 4B:
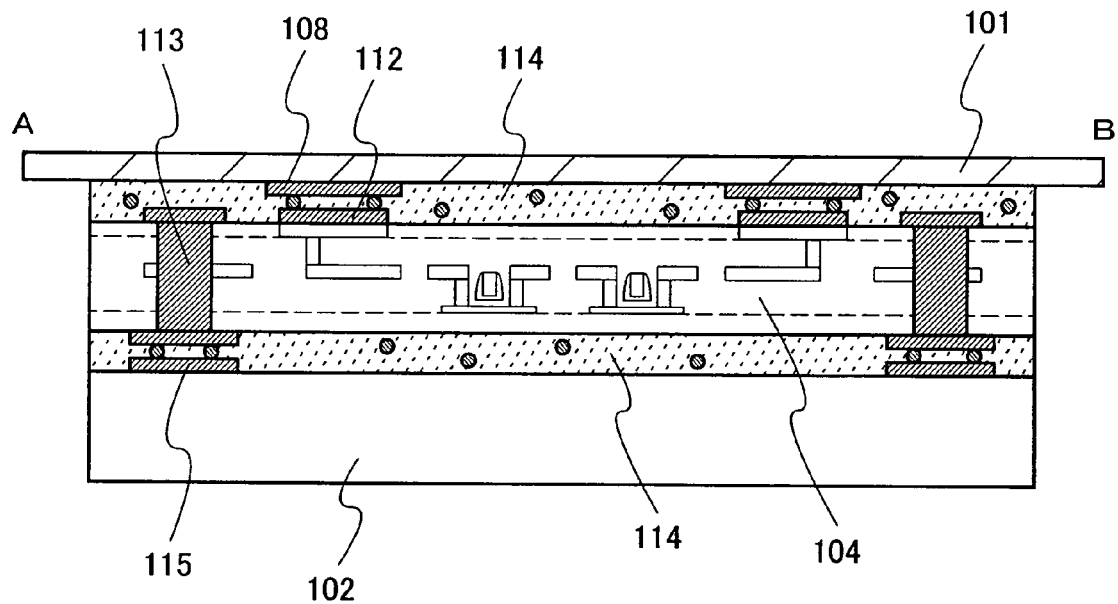

FIGS. 4A and 4B show a structure in which the antenna terminal 108 in the first structural body 101 and the connection electrode 112 in the integrated circuit 104 are located to face and be connected to each other. The second structural body 102 is located on a backside of the integrated circuit 104 so as to protect the integrated circuit 104. In a case in which a passive element such as a capacitor, a coil, and a resistor may be formed in the second structural body 102 in order to compensate functions of the integrated circuit 104, a rear surface connection electrode 113 may be formed in the integrated circuit 104 so as to electrically connect to the connection electrode 115 in the second structural body 102. The first structural body 101, the second structural body 102, and the integrated circuit 104 are preferably fixed by the adhesive 114. In the structure shown in FIGS. 4A and 4B, since the second structural body 102 is provided on the back side of the integrated circuit 104, the sealing material 116 may be approximately provided.

As described above, according to the present invention, when the structural body formed of ceramics or the like is used, stiffness of the semiconductor device can be improved. Accordingly, even when an IC tag or the semiconductor device having the equivalent function is thinned, their required functions and robustness can be maintained. When a wiring for connection is formed in the structural body formed of ceramics or the like in order to connect an antenna and the integrated circuit, malfunction caused by detachment of a connection portion can be prevented even when bending stress is applied.

Embodiment 1

In this embodiment, one example of a semiconductor device in which a first structural body provided with an antenna, a second structural body provided with a capacitor portion, and an integrated circuit are combined is described with reference to FIGS. 5A to 6B. Note that FIGS. 5A to 5C are plan views showing the semiconductor device, and FIGS. 6A and 6B are cross-sectional views taken along lines A-B and C-D, respectively.

Figure 5A:
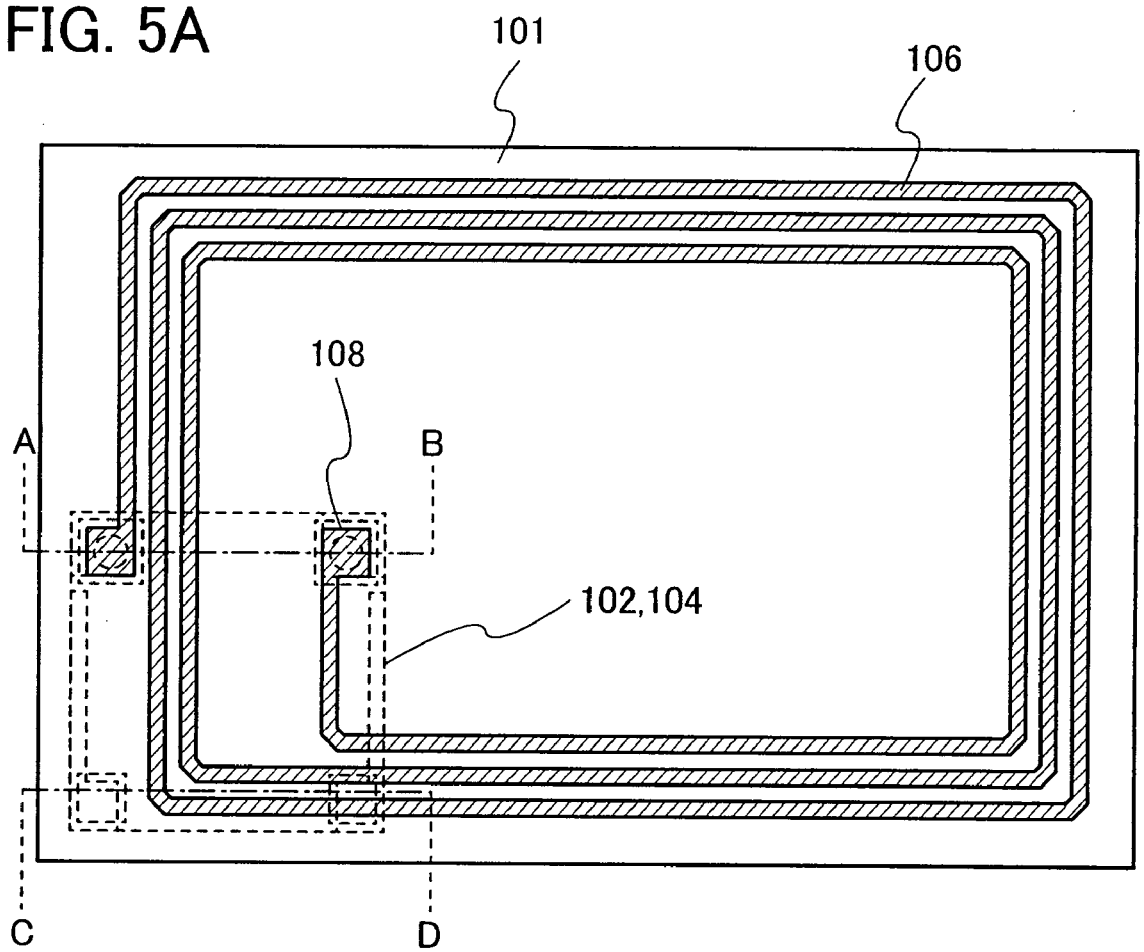
FIGS. 5A to 5C are plan views showing one example of a semiconductor device in which a first structural body provided with an antenna, a second structural body provided with a capacitor portion, and an integrated circuit are combined.
Figure 5B:
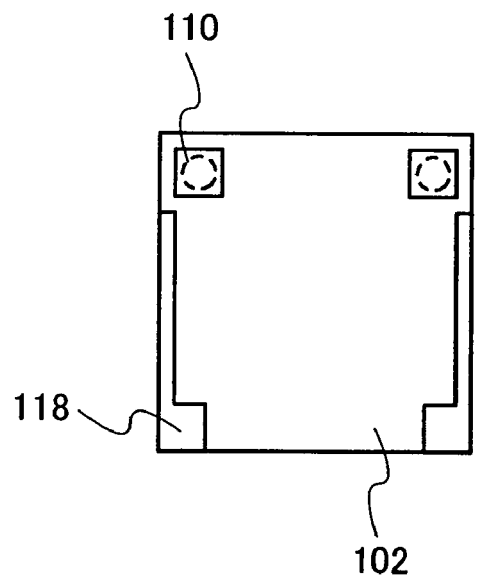
Figure 5C:
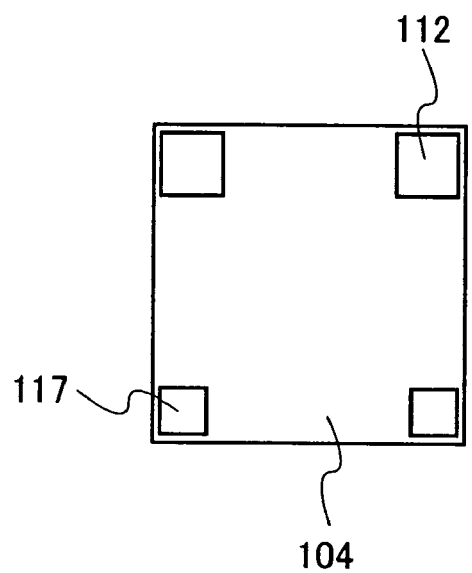
Figure 6A:
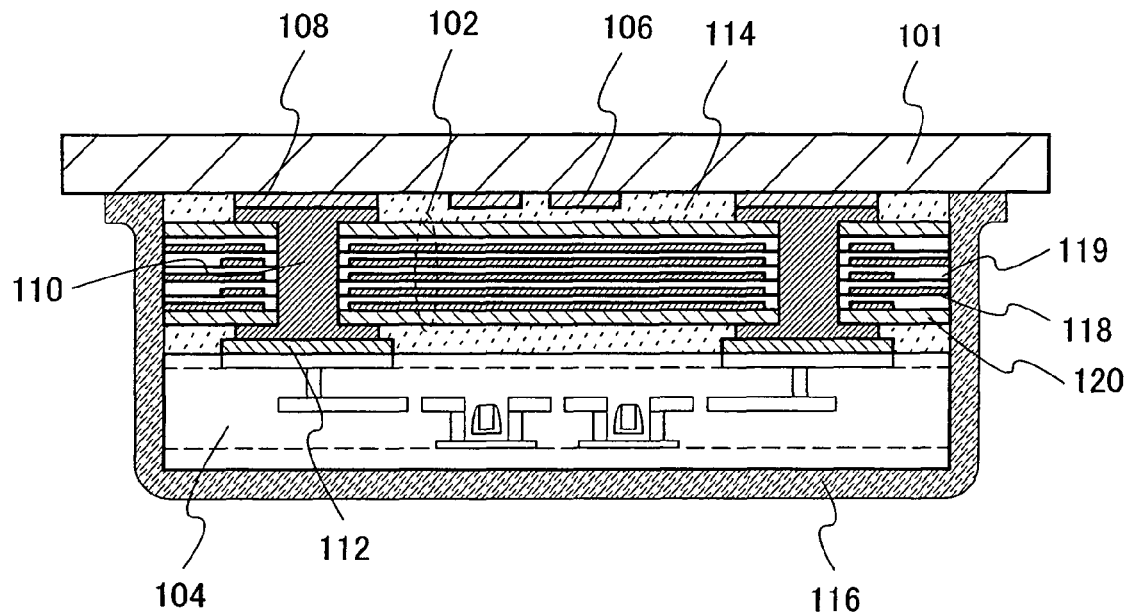
FIG. 6A is a cross-sectional view showing one example of a semiconductor device in which a first structural body provided with an antenna, a second structural body provided with a capacitor portion, and an integrated circuit are combined taken along a line A-B in FIG. 5A.
Figure 6B:
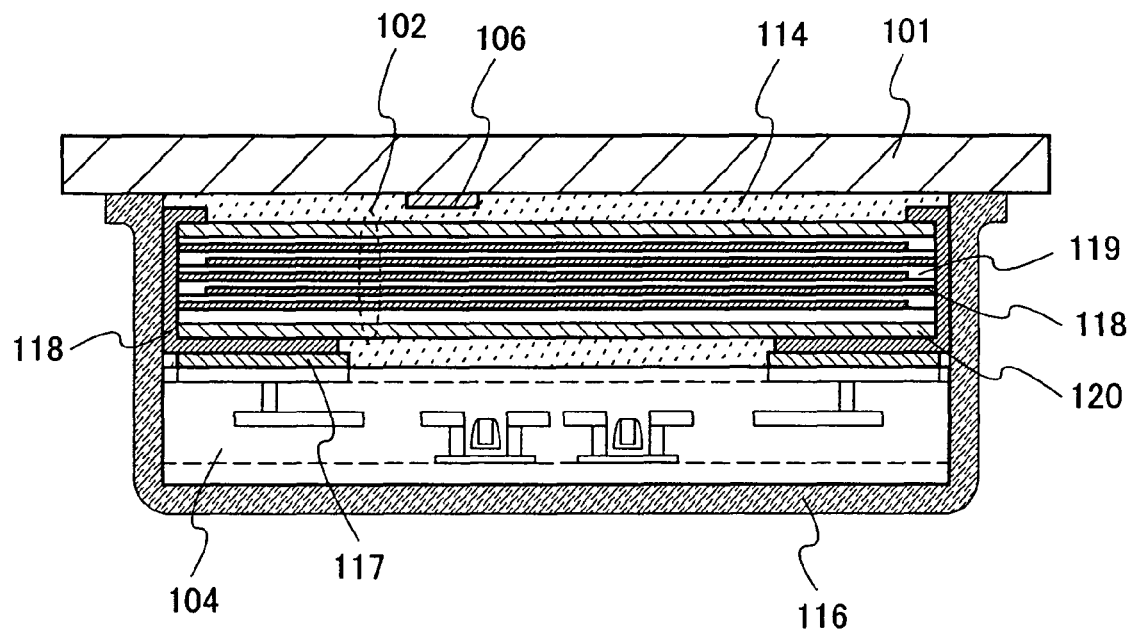
FIG. 6B is a cross-sectional view showing one example of a semiconductor device in which a first structural body provided with an antenna, a second structural body provided with a capacitor portion, and an integrated circuit are combined taken along a line C-D in FIG. 5A.

FIG. 5A shows a mode in which the antenna 106 having a coil-shape is formed in the first structural body 101. The first structural body 101 is formed of a plastic material such as PET (poly ethylene terephthalate), PEN (polyethylene naphthalate), PES (polyethersulfone), polypropylene, polypropylene sulfide, polycarbonate, polyether imide, polyphenylene sulfide, polyphenylene oxide, polysulfone, polyphthalamide, acrylic, or polyimide, or an insulating material such as nonwoven fabric or paper.

The antenna 106 is formed using a low resistant metal material such as copper, silver, or aluminum by a printing method, a plating method, or the like on the first structural body 101. The antenna 106 shown in FIGS. 5A to 5C has a coil-shape which is suitable when an electromagnetic induction method (for example, 13.56 MHz band) is employed. When a microwave method (for example, an UHF band (860 to 960 MHz band), 2.45 GHz band, or the like) is employed, a length and a shape of a conductive layer serving as antenna may be appropriately set in accordance with a wavelength of an electromagnetic wave which is used for transmitting signals. A monopole antenna, a dipole antenna, a patch antenna, or the like may be formed in this case.

FIG. 5A shows a state in which the second structural body 102 and the integrated circuit 104 are provided in accordance with the antenna terminal 108. FIG. 5B shows a plan view of the second structural body 102 and FIG. 5C shows a plan view of the integrated circuit 104. Outside dimensions of the second structural body 102 and that of the integrated circuit 104 are preferably almost the same. Alternatively, the outside dimensions of the integrated circuit 104 may be smaller than that of the second structural body 102.

The second structural body 102 is preferably formed of a ceramic material. The through electrode 110 and the capacitor electrode 118 are formed in the second structural body 102. The integrated circuit 104 includes the connection electrode 112 which is connected to the antenna terminal 108 and a capacitor portion connection electrode 117 which is connected to the capacitor electrode 118. Then, details of a connection structure between the second structural body 102 and the integrated circuit 104 is described with reference to FIGS. 6A and 6B.

FIG. 6A shows a cross-sectional view taken along the line A-B. The first structural body 101 and the integrated circuit 104 are connected to each other by the through electrode 110 formed in the second structural body 102. They are fixed by the adhesive 114. In the second structural body 102, layers each including the capacitor electrode 118 and a dielectric layer 119 are stacked to be engaged with each other. In such a manner, a capacitor is formed by stacking the dielectric layer 119 and the capacitor electrode 118.

The dielectric layer 119 is formed by applying a ceramic paste in which a ceramic material such as barium titanate (BaTiO$_3$), strontium titanate (SrTiO$_3$), or a lead-based complex perovskites compound material compound material contains a binder compound, a plasticizer, and an organic solvent, over a substrate, and by baking it. Then, an electrode paste selected from copper or a copper alloy, nickel or a nickel alloy, silver or a silver alloy, and tin or a tin alloy, is printed thereover to form the capacitor electrode. Note that when the through electrode is formed, the dielectric layer and the capacitor electrode are formed in a manner that an opening is formed in a corresponding position. They are dried, and then, cut into desired shapes, so that a plurality of the capacitor electrodes are stacked to be engaged with one another. The stacked capacitor electrodes are interposed between protective layers 120. The binder is removed, and the layers are baked and heated.

In FIGS. 6A and 6B, the dielectric layer 119 and the capacitor electrode 118 can be formed to have a thickness of 1 µm to 10 µm by using nanoparticles. Accordingly, when five dielectric layers 119 each having a thickness of 2 µm are stacked, the thickness thereof is 10 µm. Further, even when ten dielectric layers each having a thickness of 1 µm are stacked, the thickness thereof is not greater than 10 µm.

FIG. 6B shows a cross-sectional view taken along the line C-D. FIG. 6B shows a structure of the capacitor portion connection electrode 117 for the capacitor electrode 118 and the integrated circuit 104. In the second structural body 102, the capacitor electrode 118, which is formed on an outer edge, is subjected to nickel plating, tin plating, or the like. The adhesive 114 can be used for connecting the capacitor electrode 118 and the capacitor portion connection electrode 117.

As descried above, a semiconductor device including a first structural body provided with an antenna, a second structural body provided with a capacitor portion, and an integrated circuit is obtained. When the second structural body formed of ceramics or the like is used, stiffness of the semiconductor device can be improved. Accordingly, even when an IC tag or the semiconductor device having the equivalent function is thinned, their required functions and robustness can be maintained. When a wiring for connection is formed in the structural body formed of ceramics or the like in order to connect an antenna and the integrated circuit, malfunction caused by detachment of a connection portion can be prevented even when bending stress is applied.

Embodiment 2

In this embodiment, one example of a semiconductor device including a first structural body provided with an antenna, a second structural body provided with a capacitor portion, an integrated circuit, and a ceramic antenna 122 is described with reference to FIGS. 7A to 8B. Note that FIGS. 7A to 7C are plan views showing the semiconductor device, and FIGS. 8A and 8B are cross-sectional views taken along lines E-F and G-H, respectively.

Figure 7A:
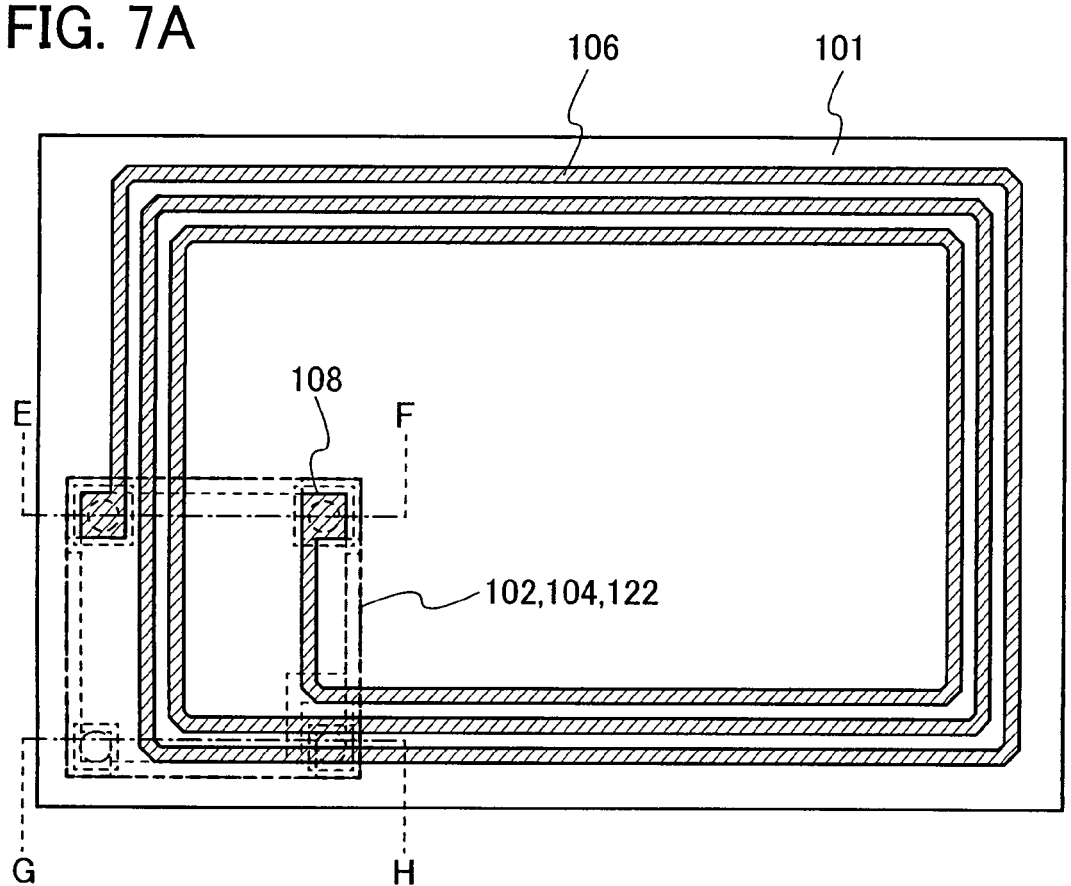
FIGS. 7A to 7D are plan views showing one example of a semiconductor device in which a first structural body provided with an antenna, a second structural body provided with a capacitor portion, an integrated circuit, and a ceramic antenna are combined.
Figure 7B:
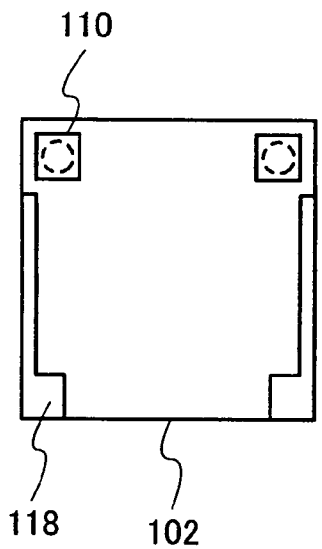
Figure 7C:
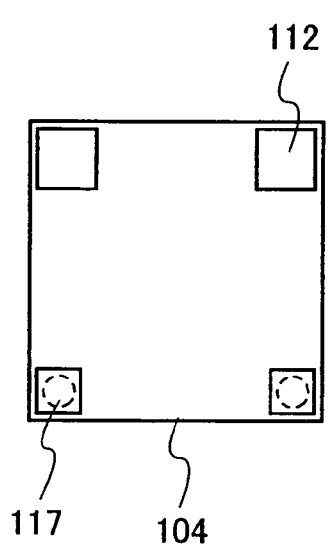
Figure 8A:
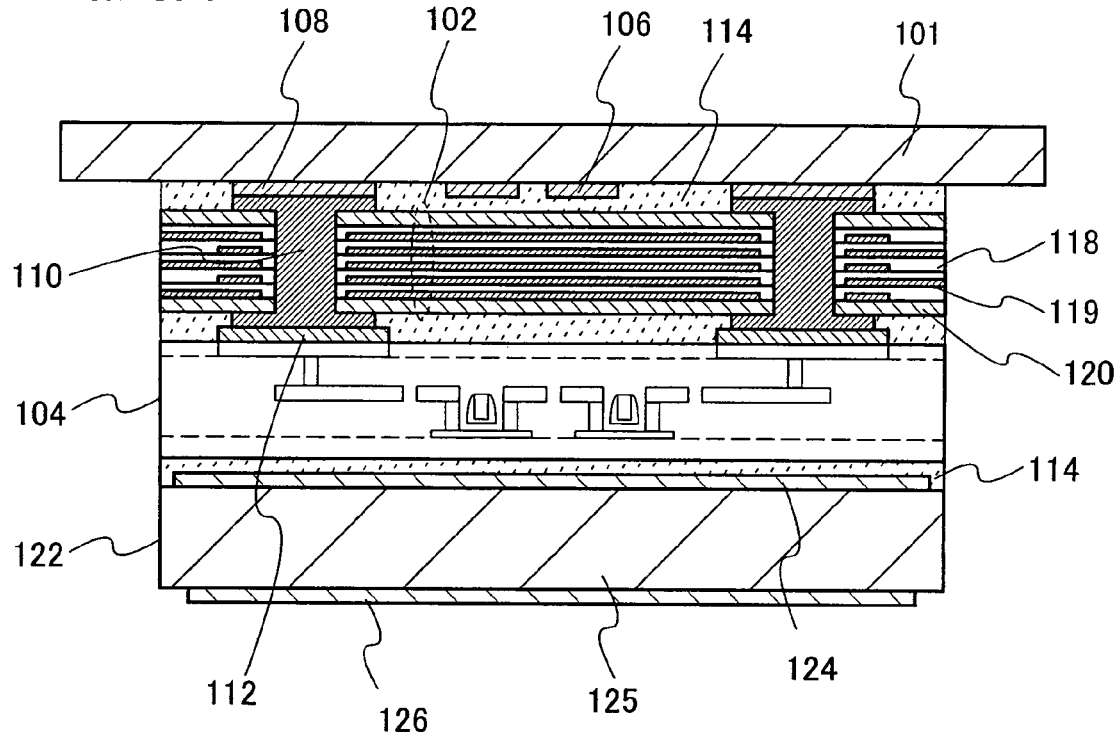
FIG. 8A is a cross-sectional view showing one example of a semiconductor device in which a first structural body provided with an antenna, a second structural body provided with a capacitor portion, an integrated circuit, and a ceramic antenna are combined taken along a line E-F in FIG. 7A.
Figure 8B:
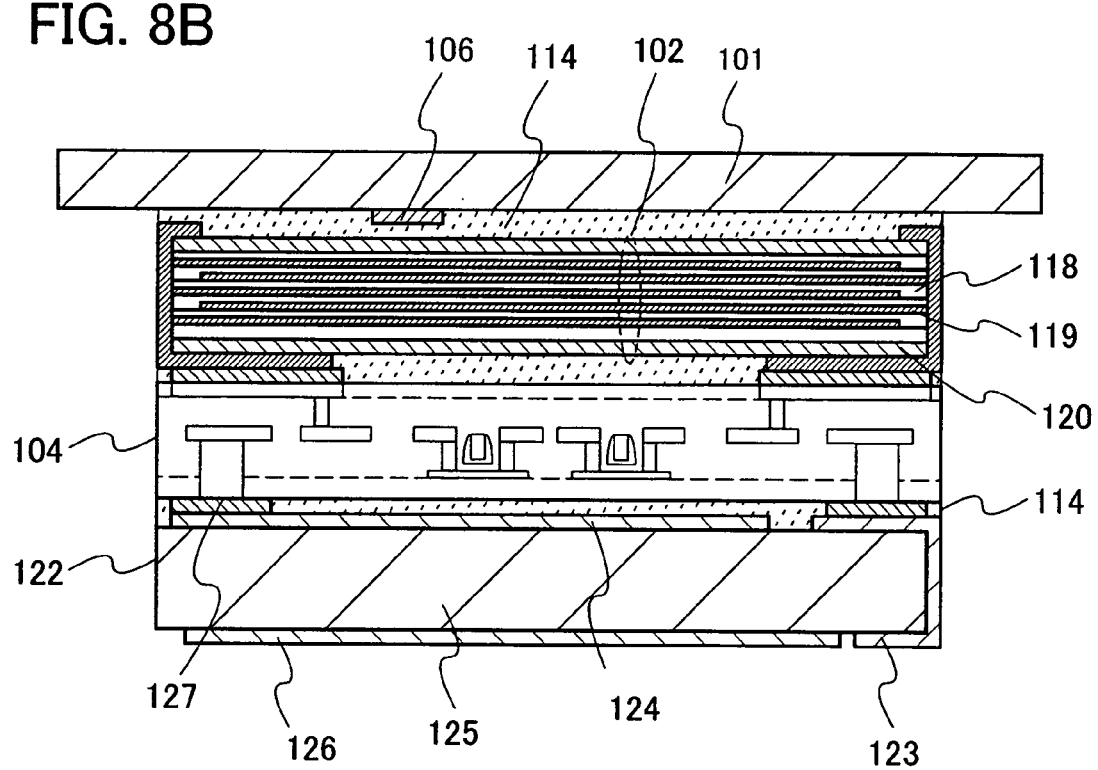
FIG. 8B is a cross-sectional view showing one example of a semiconductor device in which a first structural body provided with an antenna, a second structural body provided with a capacitor portion, an integrated circuit, and a ceramic antenna are combined taken along a line G-H in FIG. 7A.

In FIG. 7A, the antenna 106 having a coil-shape is formed in the first structural body 101. The shape of the antenna 106 may be appropriately set in accordance with a wavelength which is used for communication, as in Embodiment 1.

Figure 7D:
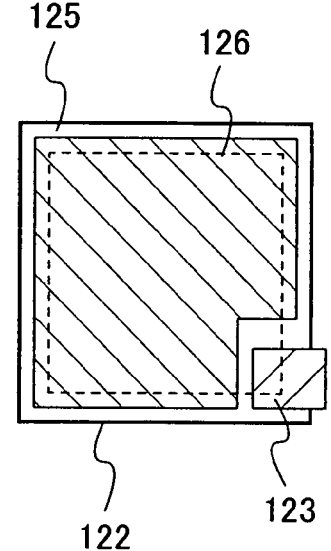

FIG. 7A shows a structure in which the second structural body 102, the integrated circuit 104, and the ceramic antenna 122 are provided in accordance with the antenna terminal 108. FIG. 7B shows a plan view of the second structural body 102, FIG. 7C shows a plan view of the integrated circuit 104, and FIG. 7D shows a plan view of the ceramic antenna 122. Outside dimensions of the second structural body 102, the integrated circuit 104, and the ceramic antenna 122 are preferably almost the same. Alternatively, the outside dimensions of the integrated circuit 104 may be smaller than those of the second structural body 102 and the ceramic antenna 122.

The second structural body 102 is formed of a ceramic material. The through electrode 110 and the capacitor electrode 118 are formed in the second structural body 102. The integrated circuit 104 includes the connection electrode 112 which is connected to the antenna terminal 108, a capacitor portion connection electrode 117 which is connected to the capacitor electrode 118, and a ceramic antenna connection electrode 127 which is connected to the ceramic antenna 122.

Then, details of a connection structure between the second structural body 102 and the integrated circuit 104 is described with reference to FIGS. 8A and 8B.

FIG. 8A shows a cross-sectional view taken along the line E-F. The second structural body 102 includes a capacitor portion formed of a ceramic material as in Embodiment 1. The structure is similar to that shown in FIG. 6A, in that the through electrode 110 connecting the antenna terminal 108 in the first structural body 101 and the connection electrode 112 in the integrated circuit 104 is provided. The ceramic antenna 122 is provided on the backside of the integrated circuit 104. The second structural body 102 and the ceramic antenna 122 which interpose the integrated circuit 104 serve as protective layers.

FIG. 8B shows a cross-sectional view taken along the line G-H and shows a connection structure between the integrated circuit 104 and the ceramic antenna 122. The ceramic antenna 122 includes a reflector 124 on one side of the dielectric substance 125 (the integrated circuit 104 side) and a grounding body 126 on the other side. The integrated circuit 104 includes the ceramic antenna connection electrode 127, to which the reflector 124 and a power feeding body 123 are connected. The grounding body 126 may have a slit to enhance directivity. The grounding body 126 and the power feeding body 123 are provided with a gap therebetween and are capacitive coupled.

This ceramic antenna 122 is used for feeding power and can have a structure in which electric power required for operation of the integrated circuit is stored in the capacitor portion in the second structural body 102. In this case, since an antenna for communicating information is formed in the first structural body 101, the capacitor portion in the second structural body 102 can be arbitrarily charged, with or without a communication signals. Accordingly, electric power needed for operation of the integrated circuit can be stored sufficiently.

As descried above, a semiconductor device in which a first structural body provided with an antenna, a second structural body provided with a capacitor portion, an integrated circuit, and a ceramic antenna are combined is obtained. When the second structural body formed of ceramics or the like and the ceramic antenna are used, stiffness of the semiconductor device can be improved. Accordingly, even when an IC tag or the semiconductor device having the equivalent function is thinned, their required functions and robustness can be maintained. When a wiring for connection is formed in the structural body formed of ceramics or the like in order to connect an antenna and the integrated circuit, malfunction caused by detachment of a connection portion can be prevented even when bending stress is applied.

Embodiment 3

In this embodiment, an example of a semiconductor device which includes a booster coil in order to increase a communication distance is described with reference to FIGS. 9A to 10B. A semiconductor device of this embodiment has an integrated circuit provided with a first antenna, a second structural body provided with a second antenna which is electromagnetically coupled with the first antenna, and a first structural body provided with a third antenna which is electromagnetically coupled with a reader/writer. Note that FIGS. 9A to 9C are plan views showing the semiconductor device, and FIGS. 10A and 10B are cross-sectional views taken along lines J-K and L-M, respectively.

Figure 9A:
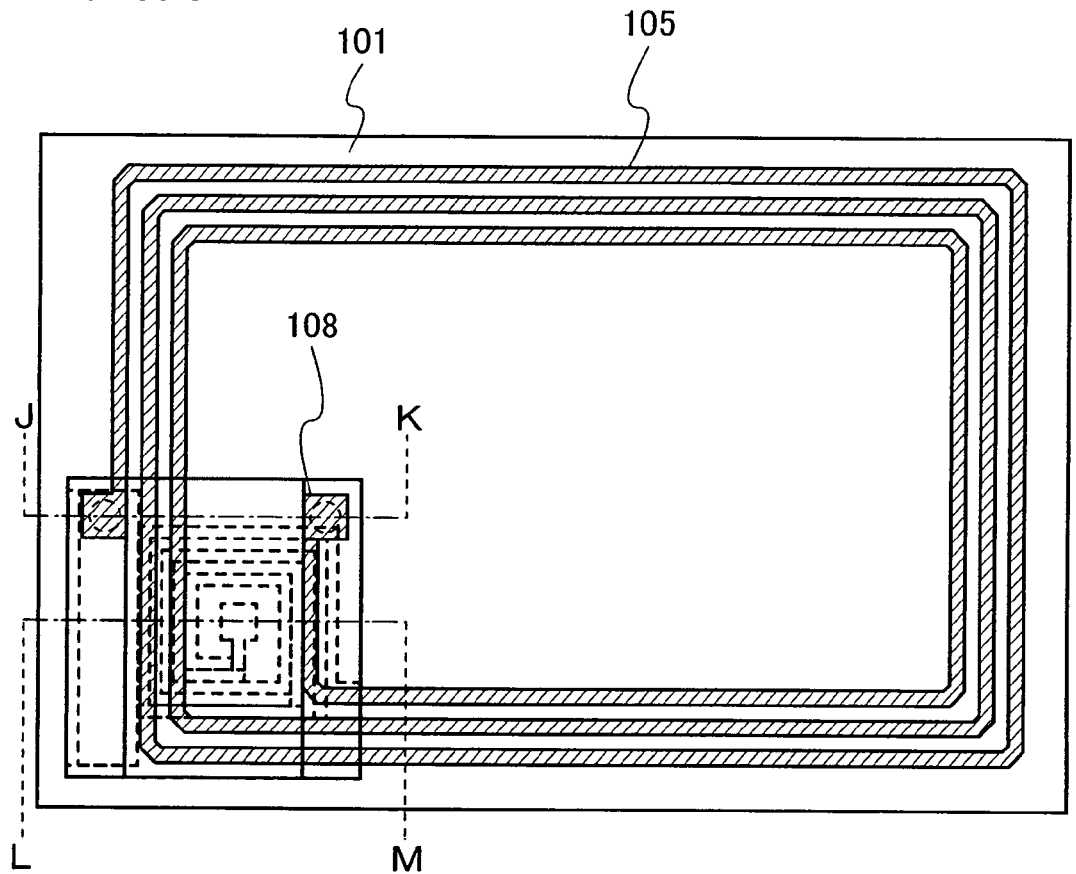
FIGS. 9A to 9C are plan views showing one example of a semiconductor device provided with a booster coil.
Figure 9B:
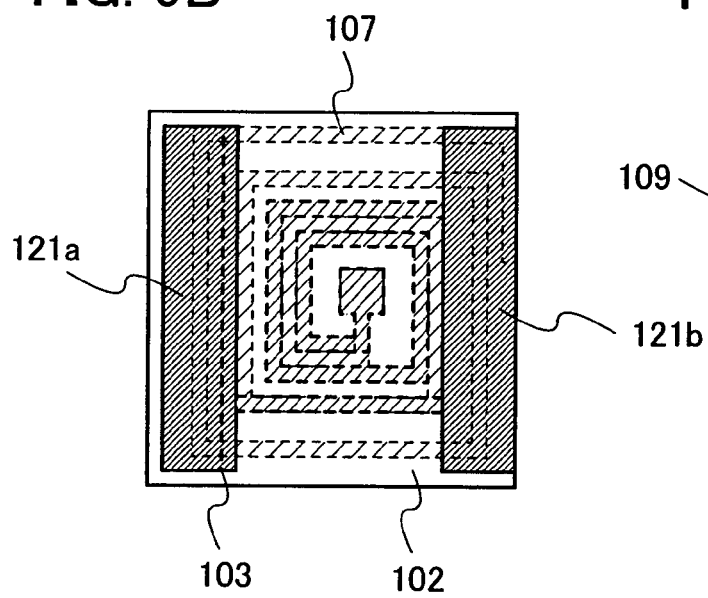
Figure 9C:
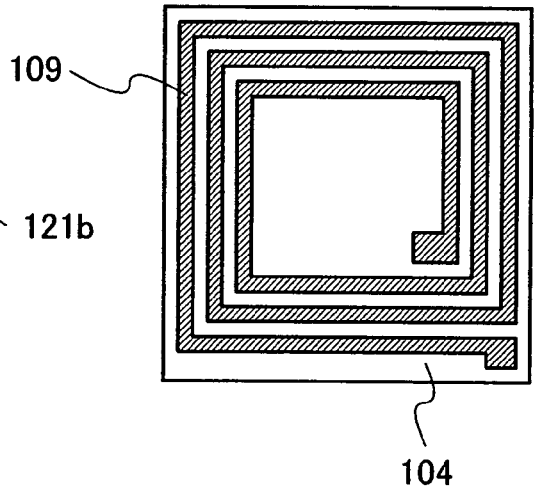
Figure 10A:
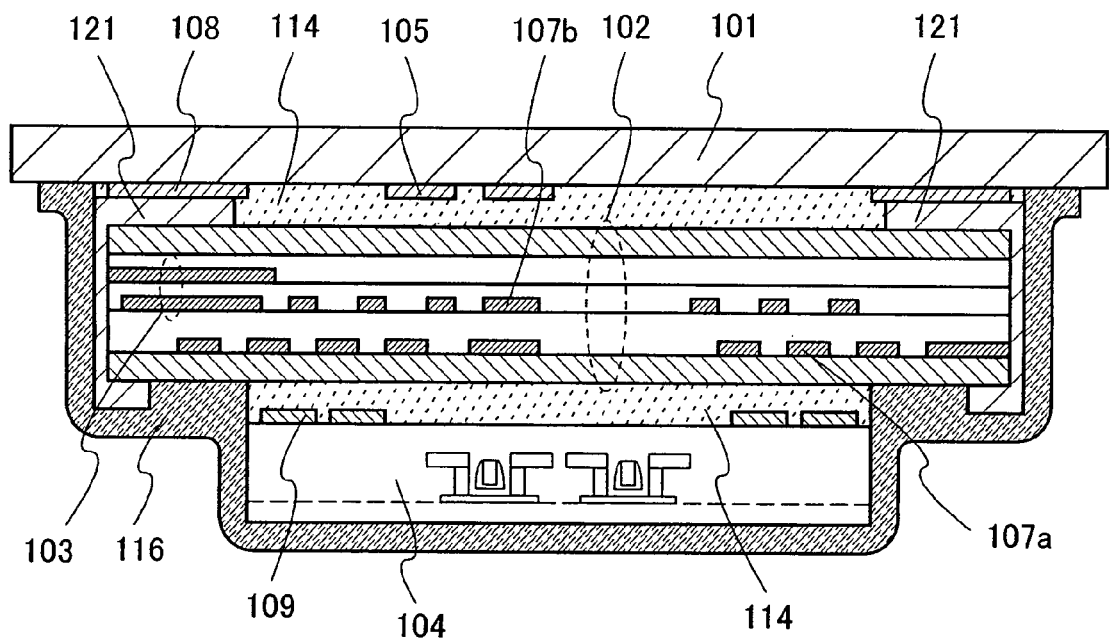
FIG. 10A is a cross-sectional view showing one example of a semiconductor device provided with a booster coil taken along a line J-K in FIG. 9A.
Figure 10B:
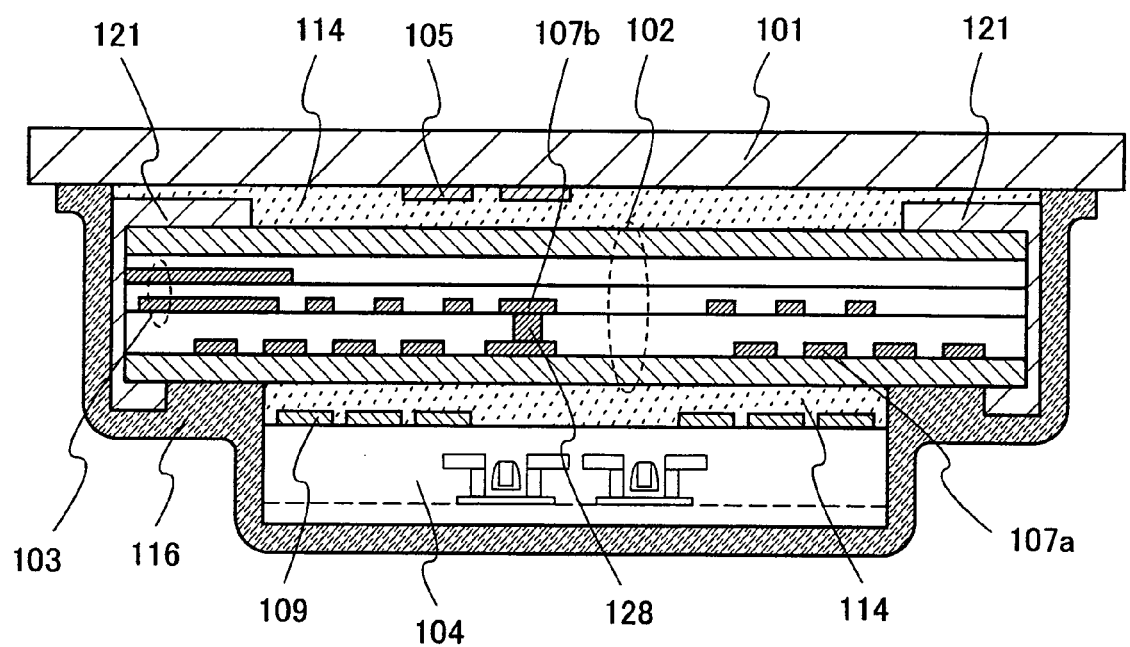
FIG. 10B is a cross-sectional view showing one example of a semiconductor device provided with a booster coil taken along a line L-M in FIG. 9A.

In FIG. 9A, a third antenna 105 which is electromagnetically coupled with a reader/writer is formed in the first structural body 101. The third antenna 105 is formed, as in Embodiment 1.

The second structural body 102 and the integrated circuit 104 are provided in accordance with the antenna terminal 108. FIG. 9B shows a plan view of the second structural body 102, and FIG. 9C shows a plan view of the integrated circuit 104. The second structural body 102 is formed of hard plastics, glass, fiberglass reinforced plastics, a ceramic material, or the like. The second structural body 102 includes the second antenna 107, an antenna connection terminal 121a, and an antenna connection terminal 121b. A coupling capacitor 103 provided between the second antenna 107 and the third antenna 105 is formed in the second structural body 102.

The integrated circuit 104 includes a first antenna 109. The integrated circuit 104 and the second structural body 102 are provided so as to overlap with each other, whereby the first antenna 109 and the second antenna 107 are provided so as to be electromagnetically coupled with each other. In this manner, when the first antenna 109 is formed in the integrated circuit 104, an electrode for connection with the second antenna 107 or the third antenna 105 is not necessarily formed. Accordingly, a defect due to poor contact of electrodes can be prevented. Outside dimensions of the second structural body 102 and the integrated circuit 104 are preferably almost the same. Alternatively, the outside dimensions of the integrated circuit 104 may be smaller than that of the second structural body 102.

Figure 11:
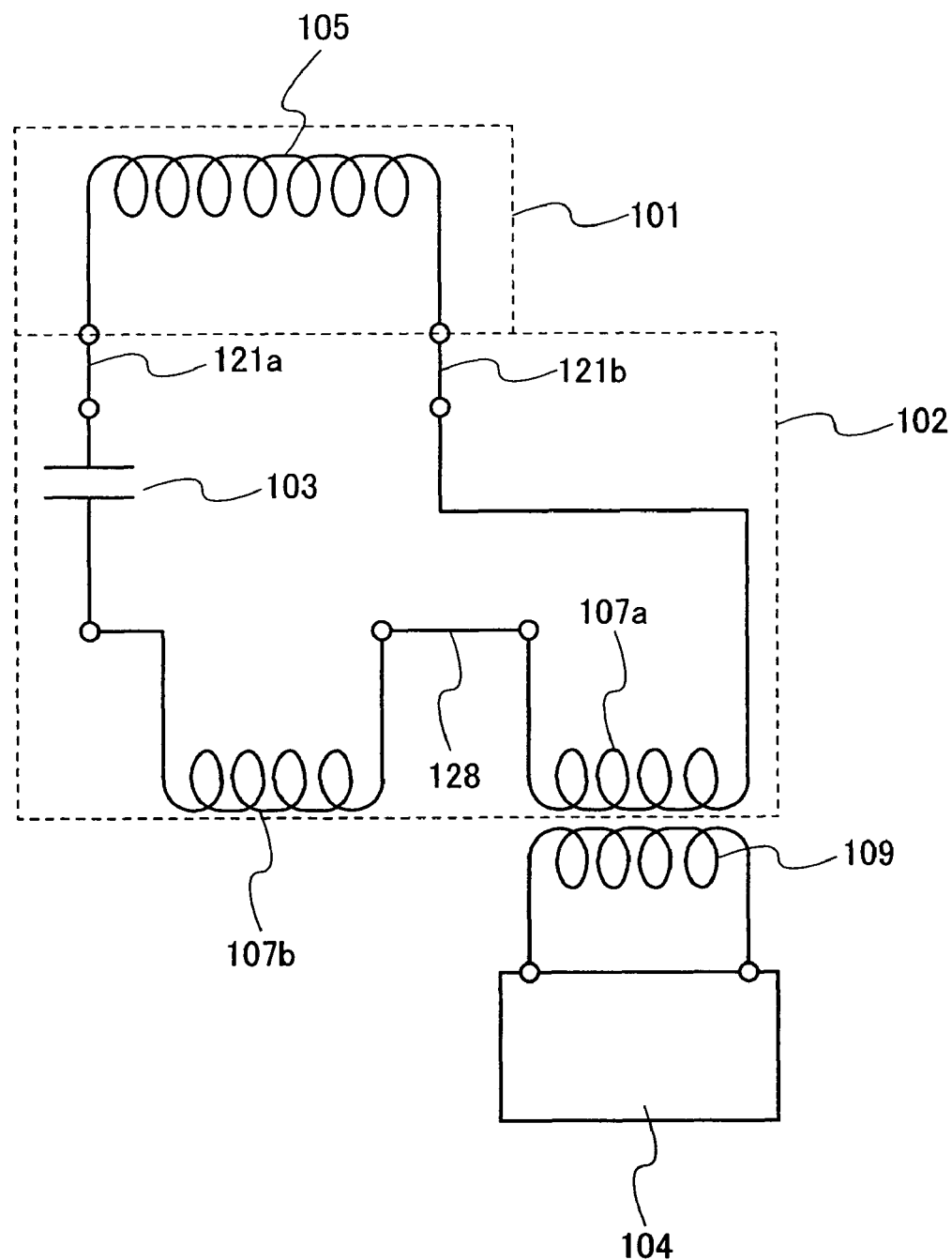
FIG. 11 is an equivalent circuit diagram of a semiconductor device provided with a booster coil.

FIG. 11 shows an equivalent circuit of the semiconductor device including the first antenna 109, the second antenna 107, and the third antenna 105. Subsequently, a connection structure of the first structural body 101, the second structural body 102, and the integrated circuit 104 is described in detail, with reference to FIGS. 10A and 10B.

FIG. 10A shows a cross-sectional view taken along the line J-K. In the second structural body 102, a plurality of insulating layers such as ceramic layers are stacked and an integrated circuit side second antenna 107a and a first structural body side second antenna 107b are formed therebetween. The integrated circuit side second antenna 107a and the first structural body side second antenna 107b are formed to at least partially overlap with each other at least partially so that they are electromagnetically coupled.

As shown in FIG. 10B, the integrated circuit side second antenna 107a and the first structural body side second antenna 107b are formed with the insulating layer such as a ceramic layer interposed therebetween, and are connected using a through hole 128 formed in the insulating layer. When the second antenna 107 is formed in a plurality of layers as described above, the number of turns of the antenna can be increased; therefore, improvement in sensitivity in electromagnetic coupling and increase in communication distance can be achieved.

The second antenna 107 (which includes the integrated circuit side second antenna 107a and the first structural body side second antenna 107b) in the second structural body 102 and an electrode of the coupling capacitor 103 can be formed, as in Embodiment 1. The antenna connection terminal 121a provided on an outer edge of the second structural body 102 is formed so as to be connected to the electrode of the coupling capacitor 103. The antenna connection terminal 121b is formed so as to be connected to a terminal of the integrated circuit side second antenna 107a. In other words, the second antenna 107 (which includes the integrated circuit side second antenna 107a and the first structural body side second antenna 107b) interposed between the insulating layers and the electrode of the coupling capacitor 103 are formed so as to be exposed partially at their ends and the antenna connection terminals 121a and 121b are formed so as to be connected the exposed portions.

As described above, when the second structural body 102 is provided with the second antenna 107, which is electromagnetically coupled with the first antenna 109 formed in the integrated circuit 104, signals can be transmitted and received without providing a connection electrode in the integrated circuit 104. In addition, by controlling the number of turns (inductance) of the second antenna 107 and the third antenna 105, a communication distance can be adjusted. Further, because the second structural body 102 including the second antenna 107 is formed of a ceramic material, the integrated circuit 104 can be protected.

Embodiment 4

One structural example of an integrated circuit such as an IC tag which can be used for storing data and identifying an individual is described with reference to FIG. 12. This embodiment can be applied to the integrated circuit described above.

Figure 12:
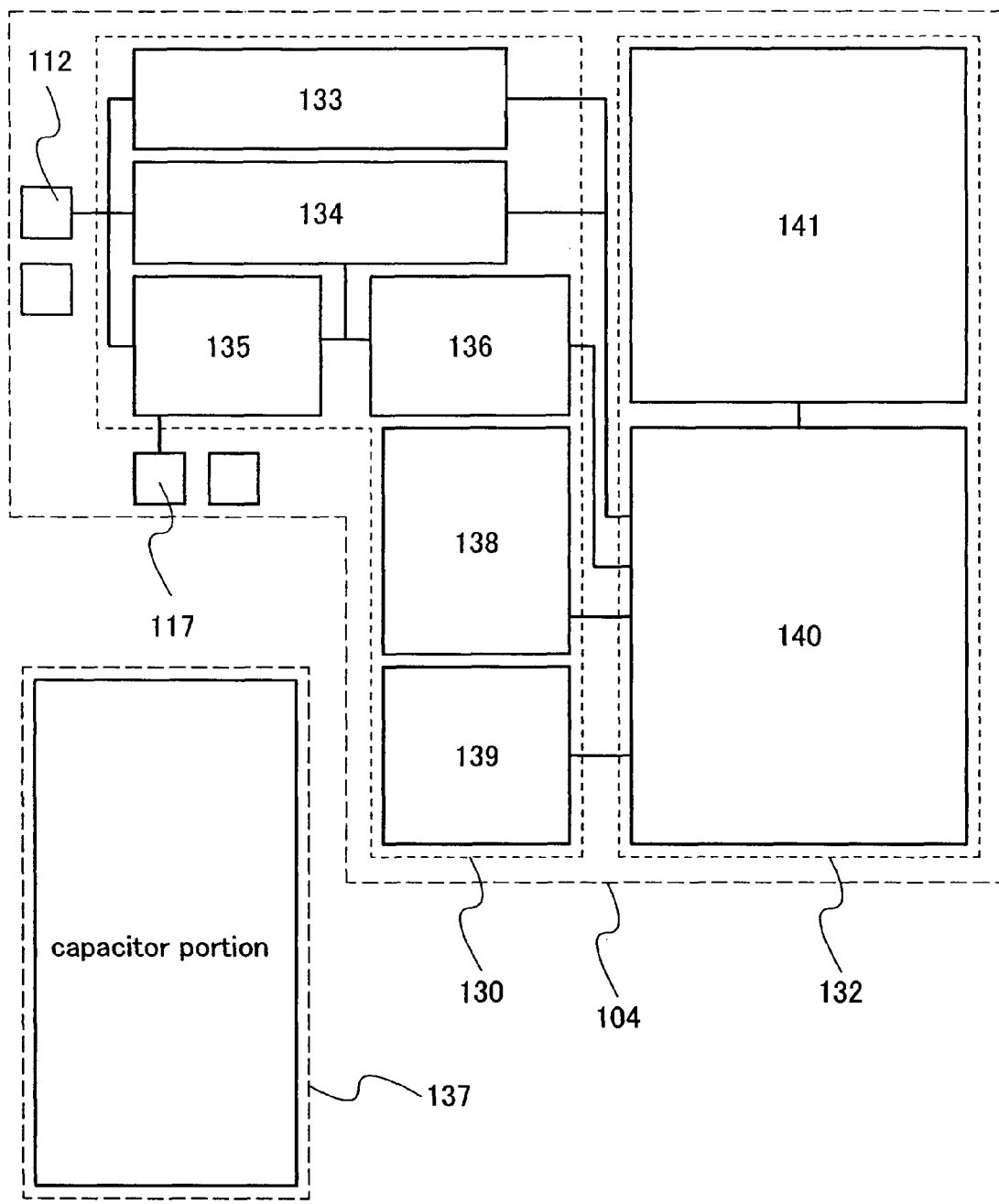
FIG. 12 is a block diagram showing one structural example of an integrated circuit which can be used for storing data and identifying an individual.

FIG. 12 shows a block diagram of the integrated circuit 104. This integrated circuit has an analog circuit portion 130 including a circuit for data transmission and reception and a power source circuit, and a digital circuit portion 132 including a logic circuit and a memory portion. The analog circuit portion 130 includes a demodulation circuit 134, a modulation circuit 133, a rectifier circuit 135, and a constant voltage circuit 136. The connection electrode 112 is a terminal and is used for connection with an antenna. The connection electrode 112 is connected to the rectifier circuit 135, the modulation circuit 133, and the demodulation circuit 134.

The demodulation circuit 134 has an LPF (Low Pass Filter) and extracts data from communication signals. The modulation circuit 133 superimposes data on the communication signals which is returning digital signals outputted from the logic circuit by, for example, Manchester encoding. The modulation circuit 133 is used for transmitting data. An oscillation circuit 138 generates clock signals needed for operation of the logic circuit. In addition, a reset circuit 139 generates reset signals in accordance with specific timing of transmission and reception of signals.

The rectifier circuit 135 rectifies a part of received signals, and charges a capacitor portion 137. The power supply voltage for driving the digital circuit portion 132 and the like is supplied from the capacitor 137. In this case, the power supply voltage may be supplied via the constant voltage circuit 136 so that the voltage is stabilized before being supplied. The capacitor portion 137 is not formed in the integrated circuit 104. The capacitor portion 137 is formed in the second structural body as shown in Embodiments 1 to 3. The capacitor portion 137 preferably has capacitance of greater than or equal to 1000 pF. When the capacitor portion is formed in the second structural body, capacitance needed for operation of the integrated circuit can be easily obtained.

The digital circuit portion 132 includes a logic circuit 140 and a memory portion 141. The logic circuit 140 includes an arithmetic processing circuit, a wireless communication interface, a clock control circuit, a control register, a reception data register, a transmission data register, a memory controller, and the like. The demodulation circuit 134 and the modulation circuit 133 transmit and receive signals to and from the control register, the reception data register, and the transmission data register via the wireless communication interface. The memory portion 141 includes a read only memory (ROM). When a rewritable memory portion 141, in which data can be added or changed is formed, a nonvolatile memory may be included. As a nonvolatile memory, a floating gate nonvolatile memory, a charge-trapping nonvolatile memory, a ferroelectric nonvolatile memory, and the like can be employed.

As described above, when the capacitor portion 137 which is conventionally formed in the integrated circuit 104 is formed in the second structural body as in Embodiments 1 to 3, the area of the integrated circuit 104 can be reduced. For example, 25% of the area of the integrated circuit 104 is conventionally occupied by the capacitor portion 137 in order to keep capacitance of 2000 p; the area of the capacitor portion 137 can be reduced according to the present invention. Thus, downsizing of the semiconductor device can be achieved. Further, the area which is conventionally used for the capacitor portion 137 can be used for the memory portion; accordingly, memory capacitance of the semiconductor device can be increased.

Embodiment 5

An example of a semiconductor device having an arithmetic function, which is capable of transmitting and receiving data without contact, is described with reference to FIG. 13. This embodiment can be applied to the integrated circuit described above.

Figure 13:
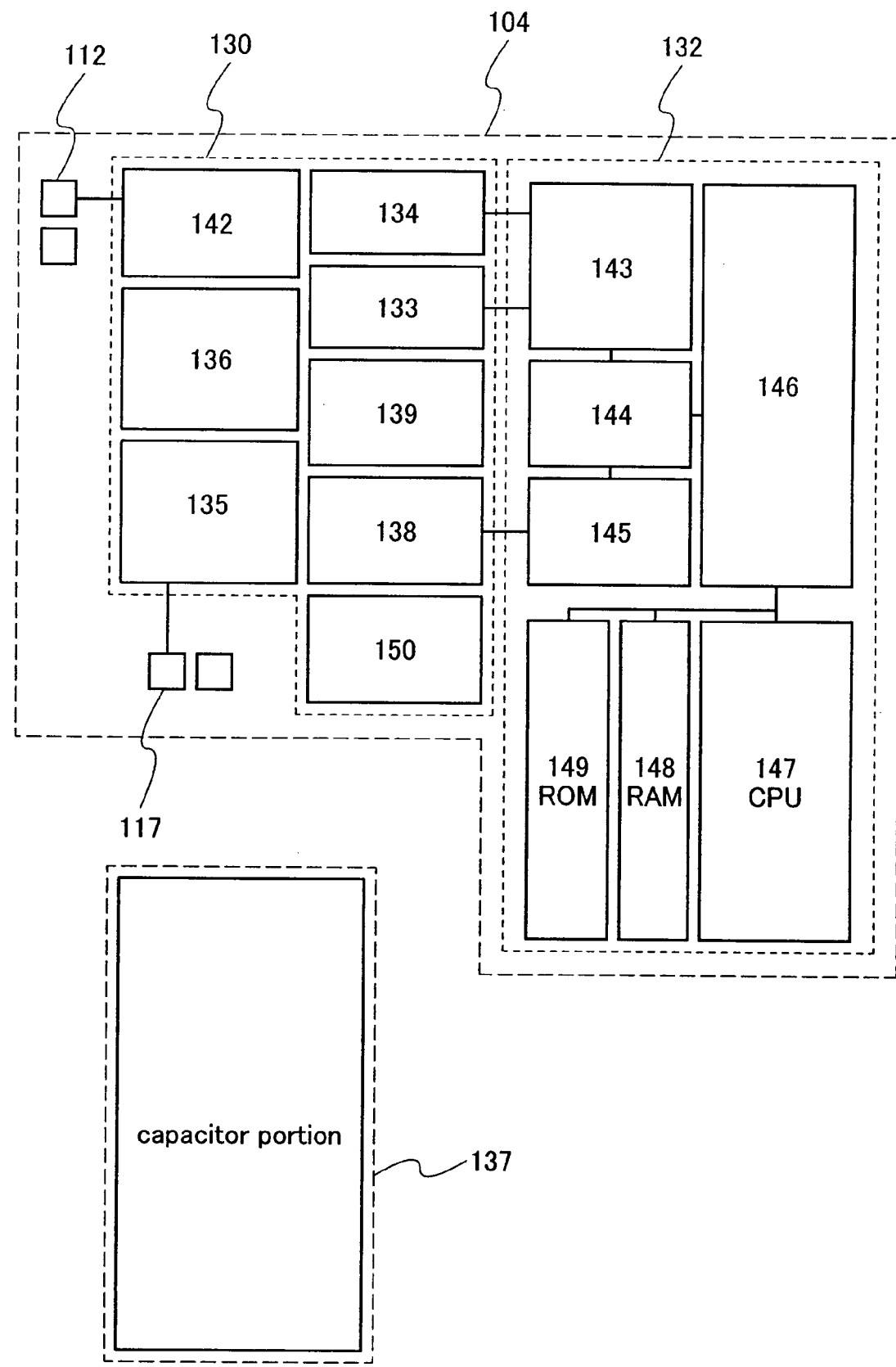
FIG. 13 is a block diagram showing an example of a semiconductor device having an arithmetic function, which is capable of transmitting and receiving data without contact.

FIG. 13 shows a block diagram of the integrated circuit 104. The integrated circuit 104 includes the analog circuit portion 130 and the digital circuit portion 132. The analog circuit portion 130 includes a resonant circuit 142 having resonant capacitance, the rectifier circuit 135, the constant voltage circuit 136, the reset circuit 139, the oscillation circuit 138, the demodulation circuit 134, and the modulation circuit 133. The digital circuit portion 132 includes an RF interface 143, a control register 144, a clock controller 145, a CPU interface 146, a CPU 147, a RAM 148, and a ROM 149.

Brief description on operation of the integrated circuit 104 having such a structure is given below. A communication signal inputted from the connection electrode 112 generates induced electromotive force in the resonant circuit 142. The capacitor portion 137 is charged with the induced electromotive force in via the rectifier circuit 135. The capacitor portion 137 is formed in the second structural body separately from the integrated circuit 104 as in Embodiment 4. Accordingly, capacitance needed for operation of the integrated circuit 104 can be sufficiently obtained. The electric power stored in the capacitor portion 137 is consumed by operation of the integrated circuit 104. Voltage supplied from the capacitor portion 137 is stabilized by the constant voltage circuit 136.

The reset circuit 139 generates signals for reset and initialization of the digital circuit portion 132. For example, a signal that rises with delay after a rise in power supply voltage is generated as a reset signal. The oscillation circuit 138 changes the frequency and the duty ratio of a clock signal in accordance with a control signal generated by the constant voltage circuit 136. The demodulation circuit 134 having a low pass filter, for example, binarizing amplitude fluctuation of ASK (Amplitude Shift Keying) modulated reception signals. The modulation circuit 133 transmits transmission data by changing the amplitude of ASK (Amplitude Shift Keying) modulated transmission signals. The modulation circuit 133 changes a resonance point of the resonance circuit 142, thereby changing amplitude of communication signals. The clock controller 145 generates a control signal for changing the frequency and the duty ratio of the clock signal in accordance with the power supply voltage or current consumption in the CPU 147. The power supply voltage is monitored by the power supply control circuit 150.

The communication signal which is inputted to the integrated circuit 104 from the connection electrode 112 is demodulated in the demodulation circuit 134, and then divided into a control command, data, and the like by the RF interface 143. The control command is stored in the control register 144. The control command includes, reading of data stored in the ROM 149, writing of data to the RAM 148, an arithmetic instruction to CPU 147, and the like. The CPU 147 accesses the ROM 149, the RAM 148, and the control register 144 via the CPU interface 146. The CPU interface 146 has a function to generate an access signal for any one of the ROM 149, the RAM 148, and the control register 144 based on an address requested by the CPU 147.

As an arithmetic method of the CPU 147, a method in which the ROM 149 stores an OS (operating system) and the program is executed by the CPU may be employed. Alternatively, a method in which a circuit dedicated to arithmetic is formed and an arithmetic process is conducted using hardware may be employed. In a method in which both hardware and software are used, a method in which a part of process is conducted in the circuit dedicated to arithmetic and the other part of the arithmetic process is conducted by the CPU using a program can be used.

In any of these cases, when capacitance of the capacitor portion 137, which supplies electric power needed for operation of the integrated circuit 104, is increased, stable operation can be ensured. In the semiconductor device of this embodiment, the capacitor portion 137 is formed in the second structural body, not in the integrated circuit 104; accordingly, sufficient capacitance can be obtained. Further, the area of the integrated circuit 104 can be reduced. Furthermore, since the second structural body has a dielectric layer formed of a material such as ceramics, the second structural body has resistance to bending stress, whereby short circuit of the capacitor portion 137 can be prevented and accumulated charges can be prevented from being released.

Embodiment 6

An example of a transistor which can be applied to the integrated circuit in any of Embodiments 1 to 5 is described.

Figure 14:
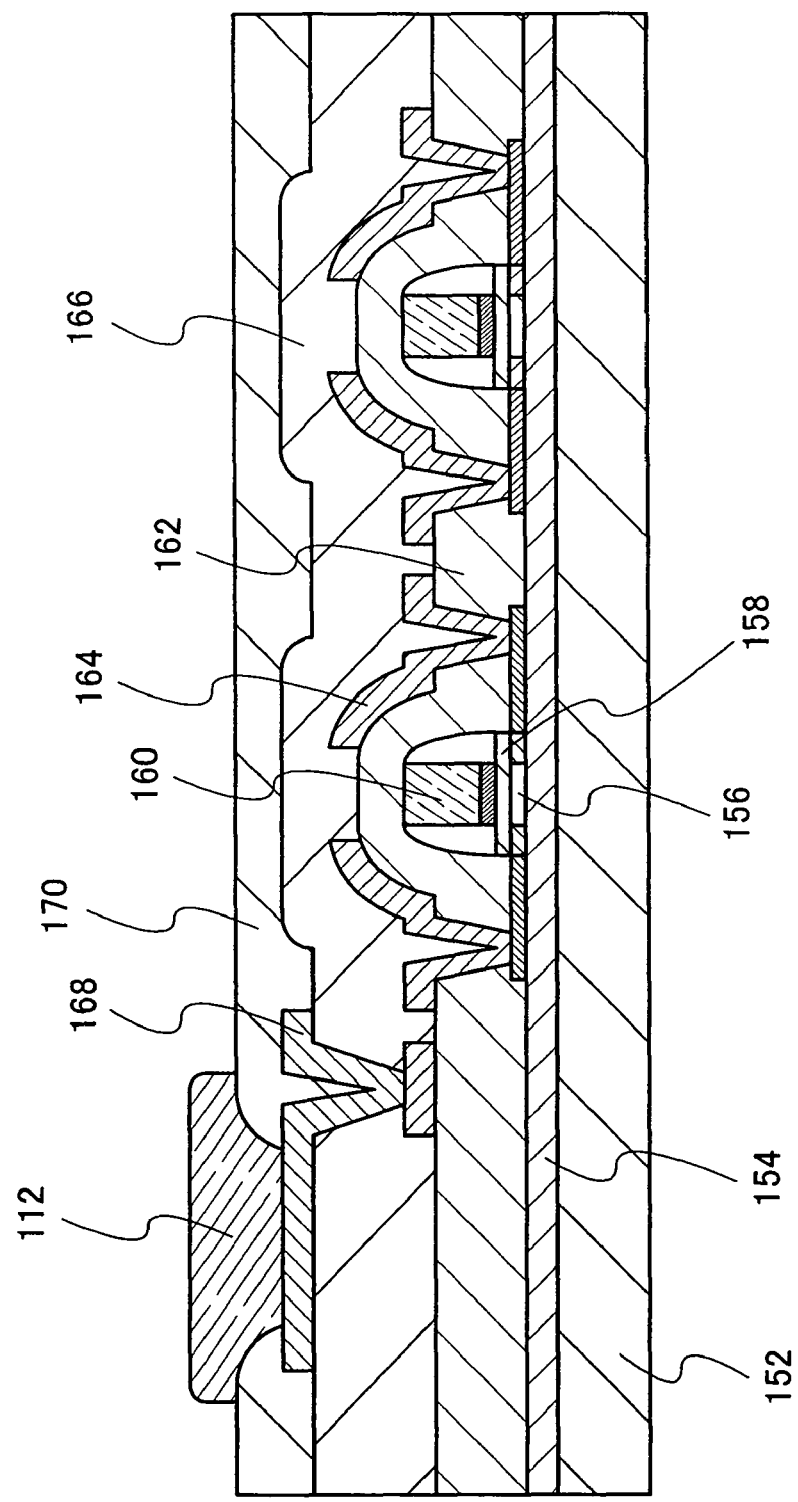
FIG. 14 is a cross-sectional view illustrating a structure of a thin film transistor for forming an integrated circuit.

FIG. 14 shows a thin film transistor formed on a substrate 152 having an insulating surface. As the substrate, a glass substrate such as an aluminosilicate glass, a quartz substrate, or the like can be employed. The thickness of the substrate 152 is 400 μm to 700 μm. The substrate 152 may be thinned to 5 μm to 100 μm by grinding. This is because mechanical strength thereof can be maintained since the substrate is combined with the second structural body 102 as shown in Embodiments 1 to 3.

A first insulating layer 154 may be formed of silicon nitride or silicon oxide over the substrate 152. The first insulating layer 154 stabilizes characteristics of the thin film transistor. A semiconductor layer 156 is preferably polycrystalline silicon. Alternatively, the semiconductor layer 156 may be a single crystalline silicon thin film, of which a grain boundary does not affect drift of carriers in a channel formation region overlapping with a gate electrode 160.

In addition, another structure in which the substrate 152 is formed of a silicon semiconductor and the first insulating layer 154 is formed of silicon oxide can be employed. In this case, the semiconductor layer 156 can be formed of single crystalline silicon. In other words, an SOI (silicon on insulator) substrate can be employed.

The gate electrode 160 is formed over the semiconductor layer 156 with the gate insulating layer 158 interposed therebetween. Side walls may be formed on opposite sides of the gate electrode 160, and a lightly doped drain may be formed in the semiconductor layer 156 due to the formation of the side walls. A second insulating layer 162 is formed of silicon oxide, silicon oxynitride, or the like. The second insulating layer is a so-called interlayer insulating layer and a first wiring 164 is formed thereover. The first wiring 164 is connected to a source region and a drain region which are formed in the semiconductor layer 156.

A third insulating layer 166 is formed of silicon nitride, silicon oxynitride, silicon oxide, or the like and a second wiring 168 is formed. The first wiring 164 and the second wiring 168 are shown in FIG. 14, but the number of wirings to be stacked may be appropriately set in accordance with a circuit structure. As for a wiring structure, an embedded plug may be formed by selective growth of tungsten in a contact hole, or a copper wiring may be formed by a damascene process.

The connection electrode 112 is exposed on the outermost surface of the integrated circuit 104. A region other than the connection electrode 112 is covered with a fourth insulating layer 170 in order not to expose, for example, the second wiring 168. The fourth insulating layer 170 is preferably formed of silicon oxide by coating in order to planarize a surface thereof. The connection electrode 112 is formed by forming a bump of copper or gold by a printing method or a plating method in order to decrease contact resistance thereof.

In such a manner, when an integrated circuit is formed using a thin film transistor, the integrated circuit 104 which operates by receiving a communication signal in an RF band (typically, 13.56 MHz) to a microwave band (typically, 2.45 GHz) can be formed.

Embodiment 7

In this embodiment, another structure of a transistor which can be applied to the integrated circuit in any of Embodiments 1 to 5 is described with reference to FIG. 15. Note that elements having similar functions to those in Embodiment 6 are denoted by the same reference numerals.

Figure 15:
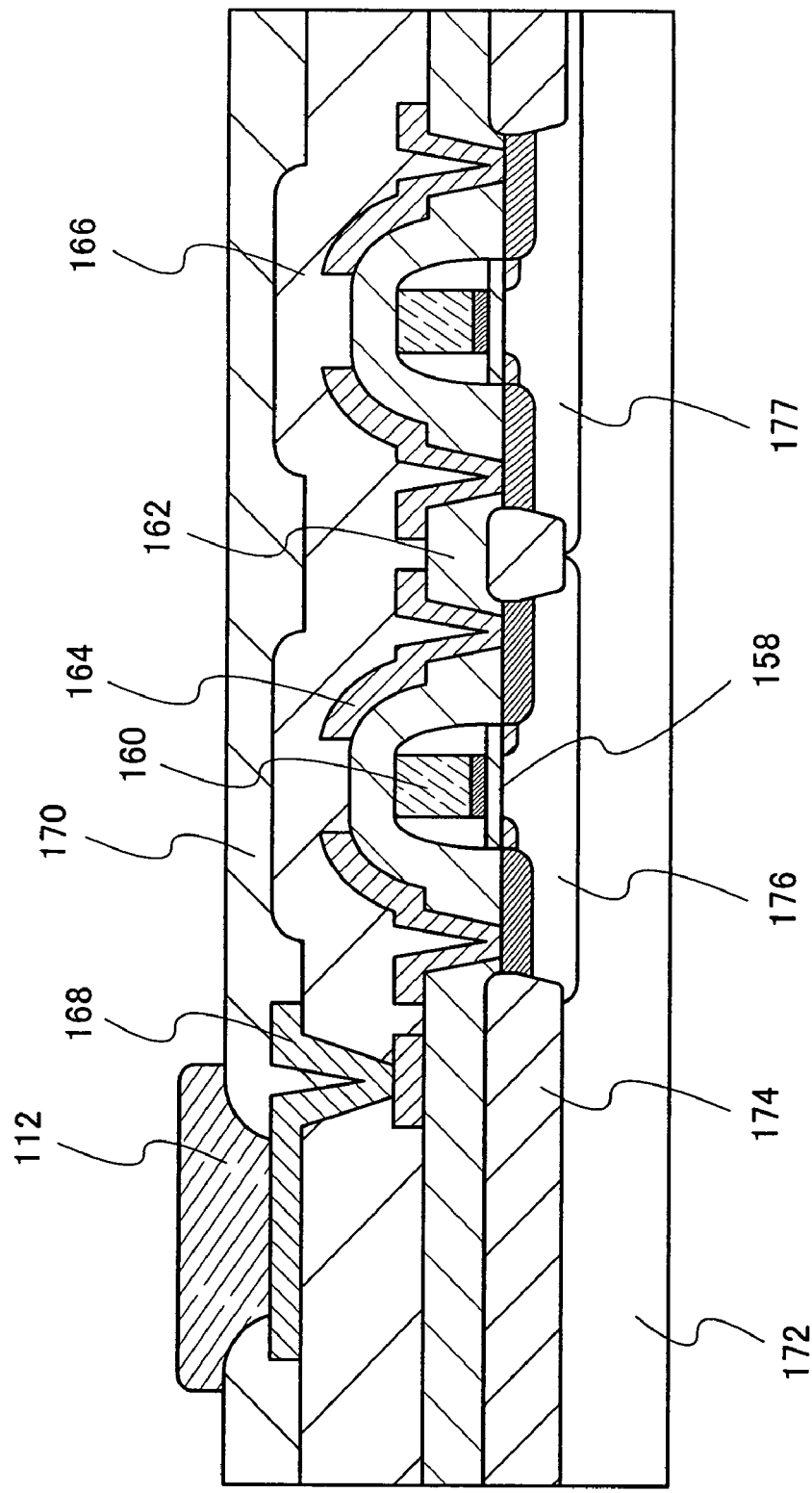
FIG. 15 is a cross-sectional view illustrating a structure of a MOS transistor for forming an integrated circuit.

FIG. 15 shows a MOS (Metal Oxide Semiconductor) transistor which is formed using a semiconductor substrate 172. As the semiconductor substrate 172, a single crystalline substrate is typically employed. The thickness of the semiconductor substrate 172 is 100 μm to 300 μm. Alternatively, the semiconductor substrate 172 may be thinned to 10 μm to 100 μm by grinding. This is because mechanical strength thereof can be maintained since the substrate is combined with the second structural body 102 as shown in Embodiments 1 to 3.

An element isolation insulating layer 174 is formed on the semiconductor substrate 172. The element isolation insulating layer 174 can be formed using a LOCOS (Local Oxidation of Silicon) technique, in which a mask such as a nitride film is formed on the semiconductor substrate 172 and is thermally oxidized to be an oxide film for element isolation. Alternatively, the element isolation insulating layer 174 may be formed by using a STI (Shallow Trench Isolation) technique in which a groove in the semiconductor substrate 172 is formed and an insulating film is embedded therein and is planarized. When the STI technique is used, the element isolation insulating layer 174 can have a steep side surface, and whereby the width needed for isolating elements can be reduced.

An n-well 176 and a p-well 177 are formed in the semiconductor substrate 172 and a so-called double-well structure can be formed, in which an n-channel transistor and a p-channel transistor are included. Alternatively, a single-well structure may be used. The gate insulating layer 158, the gate electrode 160, the second insulating layer 162, the first wiring 164, the third insulating layer 166, the second wiring 168, the connection electrode 112, and the fourth insulating layer 170 are similar to those in Embodiment 6.

In such a manner, when an integrated circuit is formed using a thin film transistor, the integrated circuit 104 which operates by receiving a communication signal in an RF band (typically, 13.56 MHz) to a microwave band (typically, 2.45 GHz) can be formed.

Embodiment 8

As described in Embodiments 1 to 7, the semiconductor device in the present invention can be thinned and since a structural body formed of ceramics or the like is attached thereto, an integrated circuit is protected. Accordingly, when the semiconductor device is embedded in a paper medium, the semiconductor device can be used without being broken. As examples of a paper medium, the following can be given: paper money, family registers, resident cards, passports, driver's licenses, ID cards, member's cards, letters of authentication, hospital cards, commutation tickets, bills, checks, carriage notes, bill of lading, warehouse receipts, stock certificates, bonds, merchandise coupons, ticket, or mortgage securities. In addition, wood free paper, inkjet printing paper, and the like can serve as forgery preventive paper. For example, a semiconductor device of the present invention can be embedded in documents referring to various kinds of confidential information, such as contract documents, or specification documents.

When a semiconductor device of the present invention is used, a lot of information, that is, more information than the information which is visually shown on a paper medium, can be held in the paper medium. For example, when such a paper medium is applied as a merchandise label or the like, the paper medium can be used for electronic systemization of merchandise management or prevention of merchandise theft. In this embodiment, examples of paper of the present invention are described with reference to FIGS. 17A to 17E. Note that, as the paper described below, paper manufactured in a manner in which vegetable fiber is used as a material, a resin, glue, or the like is added thereto, and then, the material is filtered can be used. Also, nonwoven fabric, a plastic film, and the like, which are similar to paper, can be used.

Figure 17A:
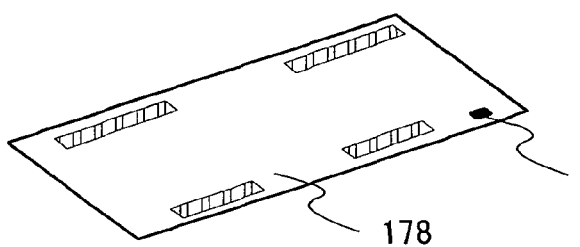
FIGS. 17A to 17E each shows an example showing paper of the present invention.

FIG. 17A is an example of a bearer bond 178 using paper embedded with the semiconductor device 100. The bearer bond 178 includes a stamp, a ticket, an admission ticket, a merchandise coupon, a book coupon, a stationery coupon, a variety of gift coupons, a variety of service coupons, and the like. When the semiconductor device 100 stores identification information of the bearer bond 178, authentication thereof becomes easier. Since the semiconductor device 100 has resistance to certain bending stress, it is not broken even when pressing pressure is applied thereto by a pointed object such as a pen tip. Therefore, the semiconductor device 100 does not interfere with transaction of the merchandise.

Figure 17B:
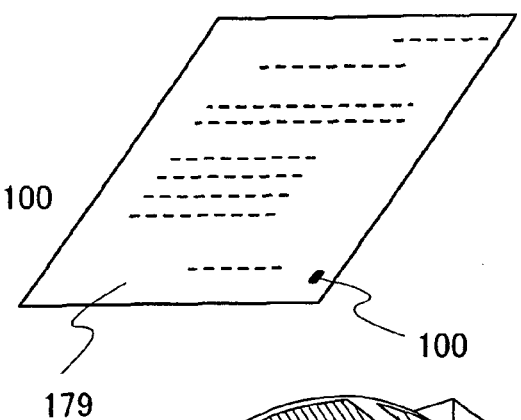

FIG. 17B is an example of a certificate 179 using paper embedded with the semiconductor device 100 of the present invention (for example, a residence certificate or a family register). When the semiconductor device 100 stores identification information of the certificate 179, authentication thereof becomes easier. Since the semiconductor device 100 has resistance to certain bending stress, it is not broken even when pressing pressure is applied thereto by a pointed object such as a pen tip. Therefore, even after the certificate 179 is issued, the semiconductor device 100 can be used for certification. Therefore, falsification of the authentication information can be prevented.

Figure 17C:
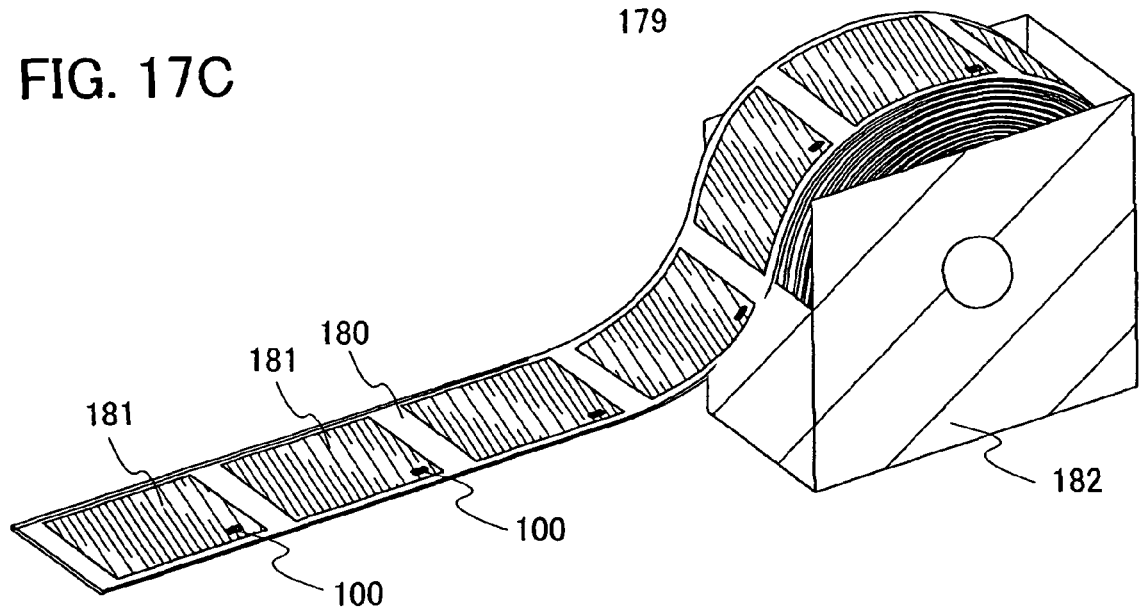

FIG. 17C is an example of a label embedded with the semiconductor device 100 of the present invention. A label (IC label) 181 is formed of the paper embedded with the semiconductor device 100 attached over a label base (separate paper) 180. The label 181 can be stored in a box 182 and provided. The label 181 is provided with a printed surface thereon which shows information on merchandise or service (a name of the merchandise, a brand, a trademark, a trademark owner, a seller, a manufacturer, and the like). Since an individual information that is unique to the merchandise (or the kind of the merchandise) can be stored in the semiconductor device 100, it is possible to easily figure out forgery, infringement of intellectual property rights such as a patent right and a trademark right, and illegal activity such as unfair competition. A large amount of information that cannot all be written on a container or a label of the merchandise can be inputted to the semiconductor device 100, for example, the area of production of the merchandise, area of sales, quality, raw material, effect, usage, quantity, shape, price, production method, usage method, time of production, time of use, expiration date, instruction manual, and intellectual property information relating to the merchandise. Accordingly, a transactor or a consumer can access such information with a simple reader. Further, when the semiconductor device 100 includes a write-once memory region in its memory portion, falsification of the data can be prevented.

Figure 17D:
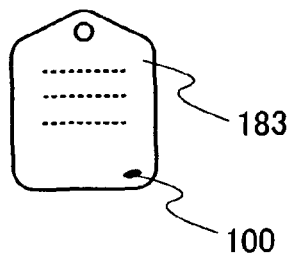
Figure 17E:
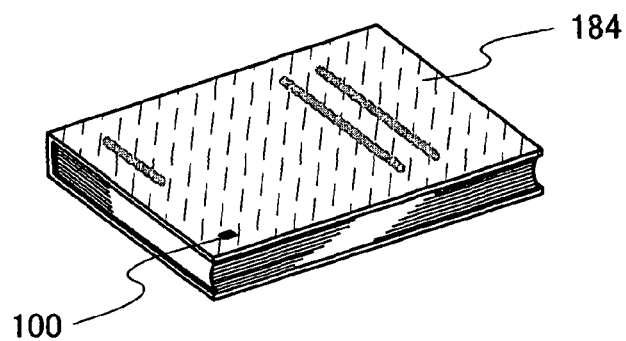

FIG. 17D shows an IC tag 183 including the semiconductor device 100. When the semiconductor device 100 is thinned and embedded in a surface of or in the paper, the IC tag can be manufactured at a lower cost than a conventional IC tag using a plastic chassis. In a case in which merchandise uses paper, the merchandise and the ID tag can be formed integrally by using the paper of the present invention. An example of such a case is shown in FIG. 17E. FIG. 17E shows a book 184 using paper of the present invention as a cover, and the cover is made of a thick paper embedded with the semiconductor device 100.

When the label 181 or the IC tag 183 using paper of the present invention is attached to merchandise, merchandise management becomes easy. For example, when the merchandise is stolen, the perpetrator can be spotted quickly by following a route of the merchandise. In this manner, by using paper of the present invention, historical management of the merchandise's raw material, area of production, manufacturing and processing, distribution, sales, and the like, as well as tracking inquiry become possible. That is, the merchandise becomes traceable. Also, by the present invention, a tracing management system of the merchandise can be introduced at a lower cost than before.

(Addition)

As described above, the present invention includes at least the following structures.

A semiconductor device which includes a first structural body provided with an antenna, an integrated circuit having a semiconductor layer interposed between insulating layers provided over and under the semiconductor layer and an active element formed with the semiconductor layer, and a second structural body with more stiffness than the first structural body, in which the antenna and the integrated circuit are connected by a through electrode formed in the second structural body.

A semiconductor device which includes a first structural body provided with an antenna, an integrated circuit having a semiconductor layer interposed between insulating layers provided over and under the semiconductor layer and an active element formed with the semiconductor layer, and a second structural body with more stiffness than the first structural body, in which the integrated circuit is provided between the first structural body and the second structural body, and in which the antenna and the integrated circuit are connected electrically.

A semiconductor device which includes a first structural body provided with an antenna, an integrated circuit having a semiconductor layer interposed between insulating layers provided over and under the semiconductor layer and an active element formed with the semiconductor layer, and a second structural body provided with a passive element and with more stiffness than the first structural body, in which the antenna and the integrated circuit are connected by a through electrode formed in the second structural body.

A semiconductor device which includes a first structural body provided with an antenna, an integrated circuit having a semiconductor layer interposed between insulating layers provided over and under the semiconductor layer and an active element formed with the semiconductor layer, and a second structural body provided with a passive element and with more stiffness than the first structural body, in which the integrated circuit is provided between the first structural body and the second structural body and has a connection portion of the antenna and a capacitor.

A semiconductor device which includes a first structural body provided with a first coil which is electromagnetically coupled with a reader/writer, an integrated circuit having a coil-shaped antenna, a semiconductor layer which is interposed between insulating layers provided over and under the semiconductor layer, and an active element formed with the semiconductor layer, and a second structural body provided with a second coil which is electromagnetically coupled with the coil-shaped antenna and which is electrically connected to the first coil.

This application is based on Japanese Patent Application serial No. 2006-206912 filed in Japan Patent Office on Jul. 28, 2006, the entire contents of which are hereby incorporated by reference.

What is claimed is:

1. A semiconductor device comprising:
a first structural body;
an antenna formed on or in the first structural body, and the antenna is provided with an antenna terminal;
an integrated circuit comprising:
a semiconductor layer interposed between a first insulating layer and a second insulating layer provided over and under the semiconductor layer;
an active element formed with the semiconductor layer; and
a connection electrode formed over the active element; and
a second structural body provided with a passive element and with more stiffness than the first structural body,
wherein the second structural body is provided between the first structural body and the integrated circuit, and
wherein the antenna terminal and the connection electrode are directly in contact with a through electrode formed in the second structural body.

2. The semiconductor device according to claim 1, wherein the first structural body is formed of a plastic sheet, a plastic film, a glass epoxy resin, a glass plate, paper, or a nonwoven fabric.

3. The semiconductor device according to claim 1, wherein the second structural body is formed of a ceramic material.

4. The semiconductor device according to claim 1, wherein the passive element includes a capacitor, a resistor, and a coil.

5. The semiconductor device according to claim 1, wherein the passive element is a capacitor in which a plurality of dielectric layers and electrodes are alternately stacked.

6. A semiconductor device comprising:
a first structural body provided with a first coil, and the first coil is electromagnetically coupled with a reader/writer;
an integrated circuit comprising:
a coil-shaped antenna;
a semiconductor layer interposed between a first insulating layer and a second insulating layer provided over and under the semiconductor layer;
an active element formed with the semiconductor layer;
a wiring formed over the semiconductor layer; and
a third insulating layer formed over the wiring; and
a second structural body provided with a passive element and a second coil, the second coil is electromagnetically coupled with the coil-shaped antenna, and the second coil is electrically connected to the first coil,
wherein the second structural body is provided between the first structural body and the integrated circuit, and
wherein the second structural body has more stiffness than the first structural body.

7. The semiconductor device according to claim 6, wherein the first structural body is formed of a plastic sheet, a plastic film, a glass epoxy resin, a glass plate, paper, or a nonwoven fabric.

8. The semiconductor device according to claim 6, wherein the second structural body is formed of a ceramic material.

9. The semiconductor device according to claim 6, wherein the passive element includes a capacitor, a resistor, and a coil.

10. The semiconductor device according to claim 6, wherein the passive element is a capacitor in which a plurality of dielectric layers and electrodes are alternately stacked.

* * * * *